United States Patent
Blatz et al.

(10) Patent No.: US 11,061,543 B1
(45) Date of Patent: Jul. 13, 2021

(54) PROVIDING RELEVANT DATA ITEMS BASED ON CONTEXT

(71) Applicant: Apple Inc., Cupertino, CA (US)

(72) Inventors: John L. Blatz, San Francisco, CA (US); Akshay Aggarwal, Cupertino, CA (US); Radhika Bhargava, San Francisco, CA (US); Daiwei Liu, San Jose, CA (US); Pallavika Ramaswamy, Cupertino, CA (US); Kelvin Ting Pui So, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/019,140

(22) Filed: Sep. 11, 2020

Related U.S. Application Data

(60) Provisional application No. 63/023,174, filed on May 11, 2020.

(51) Int. Cl.
*G06F 3/0482* (2013.01)
*G06F 3/0484* (2013.01)

(52) U.S. Cl.
CPC ........ *G06F 3/04842* (2013.01); *G06F 3/0482* (2013.01)

(58) Field of Classification Search
CPC .................................................. G06F 3/0482
See application file for complete search history.

(56) References Cited

U.S. PATENT DOCUMENTS

| | | | |
|---|---|---|---|
| 6,628,938 B1 * | 9/2003 | Rachabathuni | H04W 8/02 455/456.3 |
| 7,881,283 B2 | 2/2011 | Cormier et al. | |
| 7,885,390 B2 | 2/2011 | Chaudhuri et al. | |
| 8,823,507 B1 | 9/2014 | Touloumtzis | |
| 9,117,447 B2 | 8/2015 | Gruber et al. | |
| 9,208,153 B1 | 12/2015 | Zaveri et al. | |

(Continued)

FOREIGN PATENT DOCUMENTS

AU 2015101171 A4 10/2015

OTHER PUBLICATIONS

"Ask Alexa—Things That Are Smart Wiki", Available online at:—<http://thingsthataresmart.wiki/index.php?title=Ask_Alexa&oldid=4283>, Jun. 8, 2016, pp. 1-31.

(Continued)

*Primary Examiner* — Anil K Bhargava
(74) *Attorney, Agent, or Firm* — Dentons US LLP

(57) ABSTRACT

Systems and processes for operating an intelligent automated assistant are provided. In one example, a plurality of data items selected by a user are received, wherein a plurality of confidence values corresponding to the plurality of data items are identified. The plurality of data items is ordered. The first data item is displayed, and updated context information associated with the electronic device is received. An update to the plurality of confidence values is detected, wherein the updated plurality of confidence values includes a third confidence value associated with a third data item of the plurality of ordered data items. In accordance with a determination that the third confidence value is higher than a first confidence value of the first data item, an order of the plurality of ordered data items is modified, and the third data item of the plurality of ordered data items is displayed.

57 Claims, 21 Drawing Sheets

(56) References Cited

U.S. PATENT DOCUMENTS

| | | | |
|---|---|---|---|
| 9,483,529 | B1 | 11/2016 | Pasoi et al. |
| 9,648,107 | B1* | 5/2017 | Penilla .................. G06F 3/0482 |
| 10,496,705 | B1 | 12/2019 | Irani et al. |
| 2006/0236257 | A1* | 10/2006 | Othmer ............ H04M 1/72457 |
| | | | 715/774 |
| 2007/0032244 | A1* | 2/2007 | Counts ................... H04W 8/14 |
| | | | 455/456.1 |
| 2008/0005068 | A1* | 1/2008 | Dumais ............ G06F 16/24575 |
| 2009/0006336 | A1* | 1/2009 | Forstall .................. G06Q 30/00 |
| 2012/0323933 | A1 | 12/2012 | He et al. |
| 2013/0038437 | A1 | 2/2013 | Talati et al. |
| 2013/0110505 | A1 | 5/2013 | Gruber et al. |
| 2013/0110943 | A1 | 5/2013 | Menon et al. |
| 2013/0288722 | A1 | 10/2013 | Ramanujam et al. |
| 2014/0195252 | A1 | 7/2014 | Gruber et al. |
| 2014/0237042 | A1 | 8/2014 | Ahmed et al. |
| 2014/0282003 | A1 | 9/2014 | Gruber et al. |
| 2015/0019954 | A1* | 1/2015 | Dalal ..................... G06F 40/14 |
| | | | 715/234 |
| 2017/0336920 | A1 | 11/2017 | Chan et al. |
| 2018/0373487 | A1 | 12/2018 | Gruber et al. |
| 2019/0173996 | A1 | 6/2019 | Butcher et al. |
| 2019/0369842 | A1* | 12/2019 | Dolbakian .......... G06F 3/04817 |
| 2020/0279627 | A1* | 9/2020 | Nida ........................ G06N 5/04 |
| 2020/0357406 | A1 | 11/2020 | York et al. |

OTHER PUBLICATIONS

Ashbrook, Daniell, "Enabling Mobile Microinteractions", May 2010, 186 pages.
Bell, Jason, "Machine Learning Hands-On for Developers and Technical Professionals", Wiley, 2014, 82 pages.
Coulouris et al., "Distributed Systems: Concepts and Design (fifth Edition)", Addison-Wesley, 2012, 391 pages.
Hutsko et al., "iPhone All-in-One for Dummies", 3rd Edition, 2013, 98 pages.
Jefford et al., "Professional BizTalk Server 2006", Wrox, 2007, 398 pages.
Rowland et al., "Designing Connected Products: UX for the Consumer Internet of Things", O'Reilly, May 2015, 452 pages.
Samsung, "SGH-a885 Series—Portable Quad-Band Mobile Phone-User Manual", Jan. 1, 2009, 144 pages.
Seroter et al., "SOA Patterns with BizTalk Server 2013 and Microsoft Azure", Packt Publishing, Jun. 2015, 454 pages.
Wikipedia, "Home Automation", Available online at:—<https://en.wikipedia.org/w/index.php?title=Home_automation&oldid=686569068>, Oct. 19, 2015, 9 pages.
Search Report and Opinion received for Danish Patent Application No. PA202070775, dated Apr. 29, 2021, 9 pages.

* cited by examiner

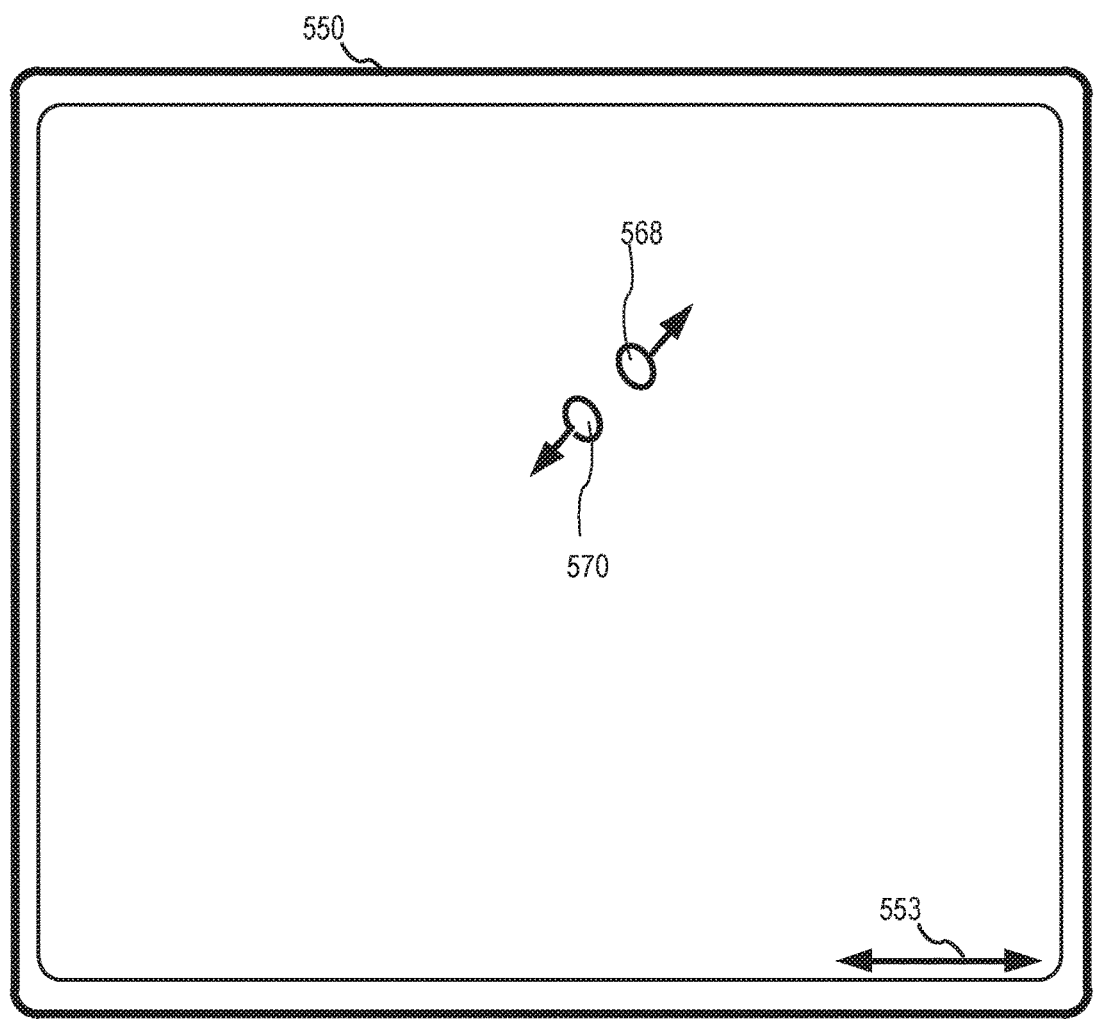
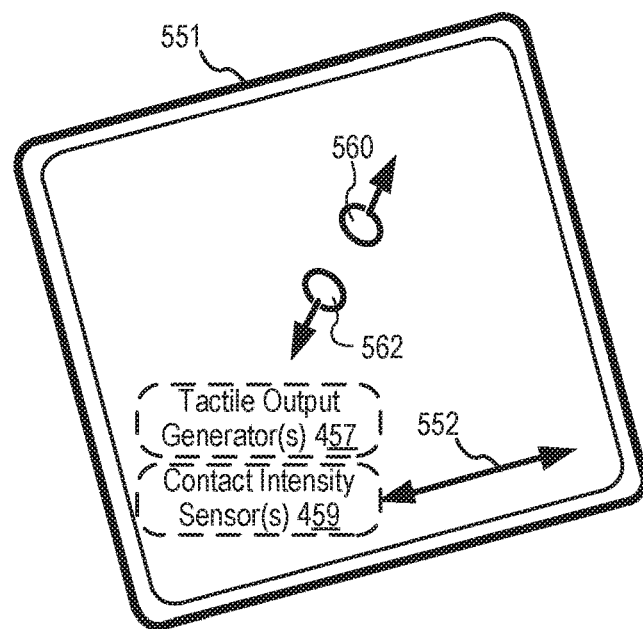
*FIG. 5B*

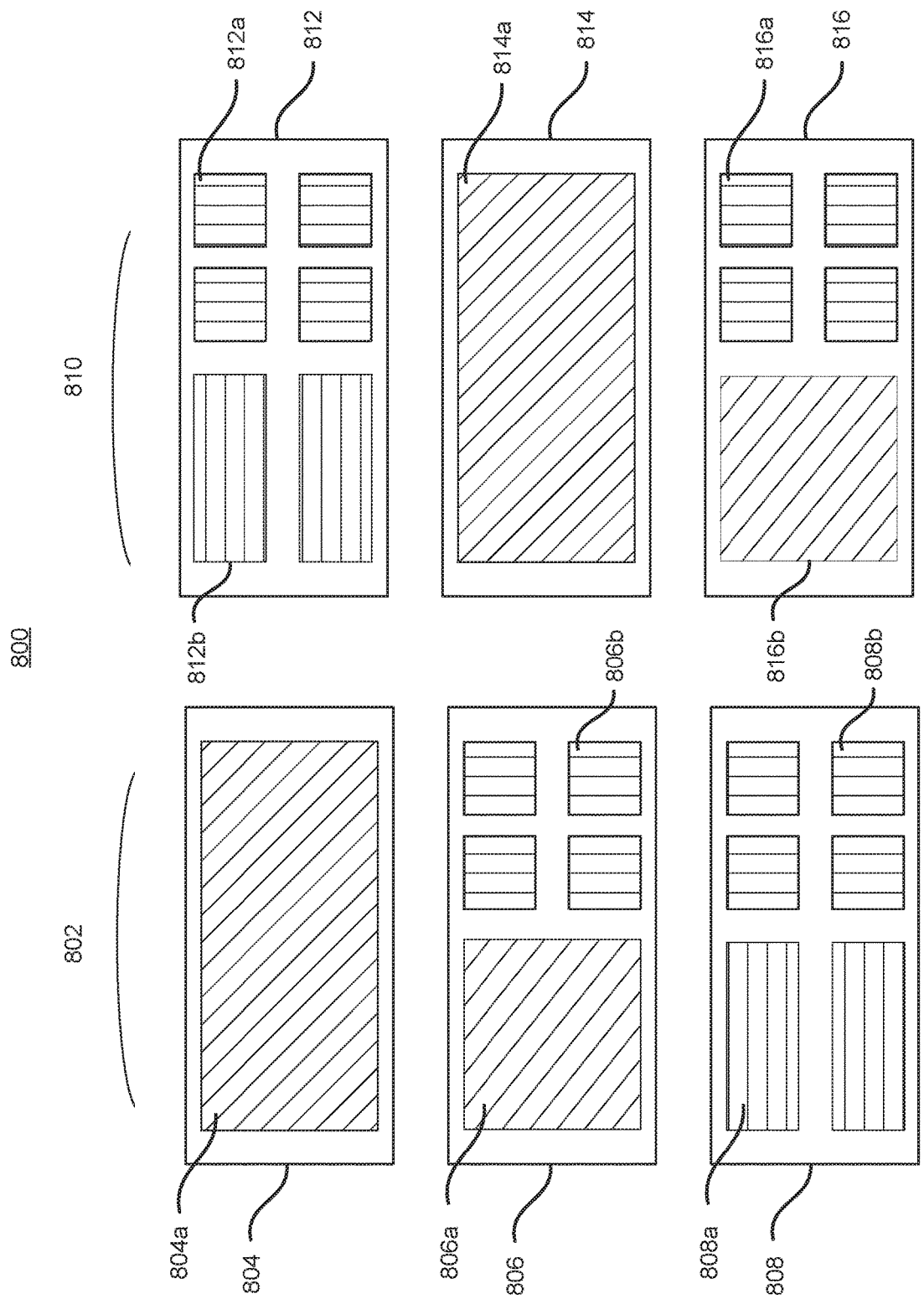

US 11,061,543 B1

PROVIDING RELEVANT DATA ITEMS BASED ON CONTEXT

CROSS REFERENCE TO RELATED APPLICATIONS

This application claims the benefit of U.S. Provisional Application No. 63/023,174, entitled "PROVIDING RELEVANT DATA ITEMS BASED ON CONTEXT," filed May 11, 2020, the content of which is hereby incorporated by reference in its entirety for all purposes.

FIELD

This application relates generally to intelligent automated assistants and, more specifically, to providing relevant data items based on context.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

Electronic devices generally have access to large amounts of information and other data that users may find particularly relevant depending on a given context. For instance, such data may reside on an electronic device, such as user information related to calendar appointments, frequently used applications or related tasks, user-created media such as photos and videos, and the like. The information may also be received from external sources, such as weather updates or breaking news information. However, conventional systems are not well equipped to selectively provide this information to the user in an efficient and sophisticated manner. For example, traditional electronic devices do not effectively surface relevant information to users depending on device context, such as a relevant device application, prediction of a task, or pertinent glanceable information. Accordingly, an improved system for providing relevant data items based on context is desired.

SUMMARY

Systems and processes for operating an intelligent automated assistant are provided. In one example, a plurality of data items selected by a user are received, wherein a plurality of confidence values corresponding to the plurality of data items are identified. The plurality of data items is ordered, wherein the first data item is displayed, and updated context information associated with the electronic device is received. An update to the plurality of confidence values is detected, wherein the updated plurality of confidence values includes a third confidence value associated with a third data item of the plurality of ordered data items. In accordance with a determination that the third confidence value is higher than a first confidence value of the first data item, an order of the plurality of ordered data items is modified, and the third data item of the plurality of ordered data items is displayed.

BRIEF DESCRIPTION OF THE DRAWINGS

FIG. 5B illustrates an exemplary user interface for a multifunction device with a touch-sensitive surface that is separate from the display, according to various examples.

FIG. 8 illustrates a system for providing relevant data items based on context, according to various examples.

DETAILED DESCRIPTION

Figure 1:
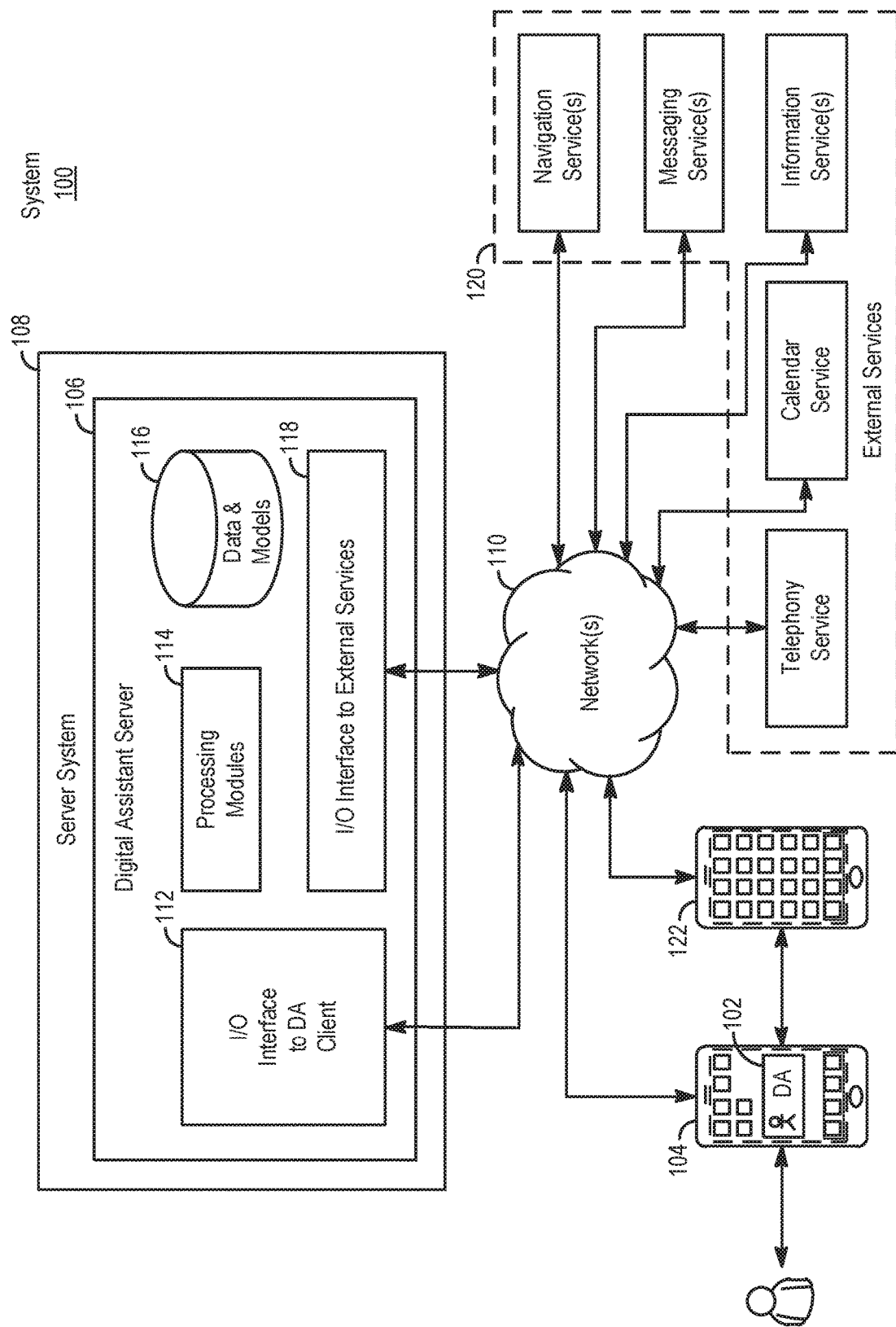
FIG. 1 is a block diagram illustrating a system and environment for implementing a digital assistant, according to various examples.

In the following description of examples, reference is made to the accompanying drawings in which are shown by way of illustration specific examples that can be practiced. It is to be understood that other examples can be used and structural changes can be made without departing from the scope of the various examples.

Conventional techniques for providing relevant data items based on context are generally lacking in effectiveness. In particular, traditional systems are not well equipped to surface relevant data items to a user based on context, much less to provide continually updated data items for the user's viewing and selection based on ever-changing device context. Device context can change rapidly due to global events or other environmental changes, such as breaking news (e.g., news related to sports, politics, natural disasters, etc.), weather events (e.g., incoming storms, hail warnings, etc.), and other important events such as emergency public service announcements and governmental notifications. For example, several highly relevant data items may be available for display to a user (e.g., a calendar event, a task for calling a friend, and an application prediction). Conventional devices are not capable of effectively displaying these data items to a user, much less determining which items to display and in which order. In addition, these devices do not provide a user interface and underlying logic for allowing a user to effectively navigate through such data items.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

FIG. 1 illustrates a block diagram of system 100 according to various examples. In some examples, system 100 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1, in some examples, a digital assistant is implemented according to a client-server model. The digital assistant includes client-side portion 102 (hereafter "DA client 102") executed on user device 104 and server-side portion 106 (hereafter "DA server 106") executed on server system 108. DA client 102 communicates with DA server 106 through one or more networks 110. DA client 102 provides client-side functionalities such as user-facing input and output processing and communication with DA server 106. DA server 106 provides server-side functionalities for any number of DA clients 102 each residing on a respective user device 104.

In some examples, DA server 106 includes client-facing I/O interface 112, one or more processing modules 114, data and models 116, and I/O interface to external services 118. The client-facing I/O interface 112 facilitates the client-facing input and output processing for DA server 106. One or more processing modules 114 utilize data and models 116 to process speech input and determine the user's intent based on natural language input. Further, one or more processing modules 114 perform task execution based on inferred user intent. In some examples, DA server 106 communicates with external services 120 through network(s) 110 for task completion or information acquisition. I/O interface to external services 118 facilitates such communications.

User device 104 can be any suitable electronic device. In some examples, user device 104 is a portable multifunctional device (e.g., device 200, described below with reference to FIG. 2A), a multifunctional device (e.g., device 400, described below with reference to FIG. 4), or a personal electronic device (e.g., device 600, described below with reference to FIGS. 6A-B.) A portable multifunctional device is, for example, a mobile telephone that also contains other functions, such as PDA and/or music player functions. Specific examples of portable multifunction devices include the Apple Watch®, iPhone®, iPod Touch®, and iPad® devices from Apple Inc. of Cupertino, Calif. Other examples of portable multifunction devices include, without limitation, earphones/headphones, speakers, and laptop or tablet computers. Further, in some examples, user device 104 is a non-portable multifunctional device. In particular, user device 104 is a desktop computer, a game console, a speaker, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatus or a distributed network of computers. In some examples, server system 108 also employs various virtual devices and/or services of third-party service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to devices 200, 400, or 600 described below with reference to FIGS. 2A, 4, and 6A-B. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information (e.g., a user request received at user device 104) to DA server 106 via second user device 122. DA server 106 processes the information and returns relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server system 106.

Although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

2. Electronic Devices

Figure 2A:
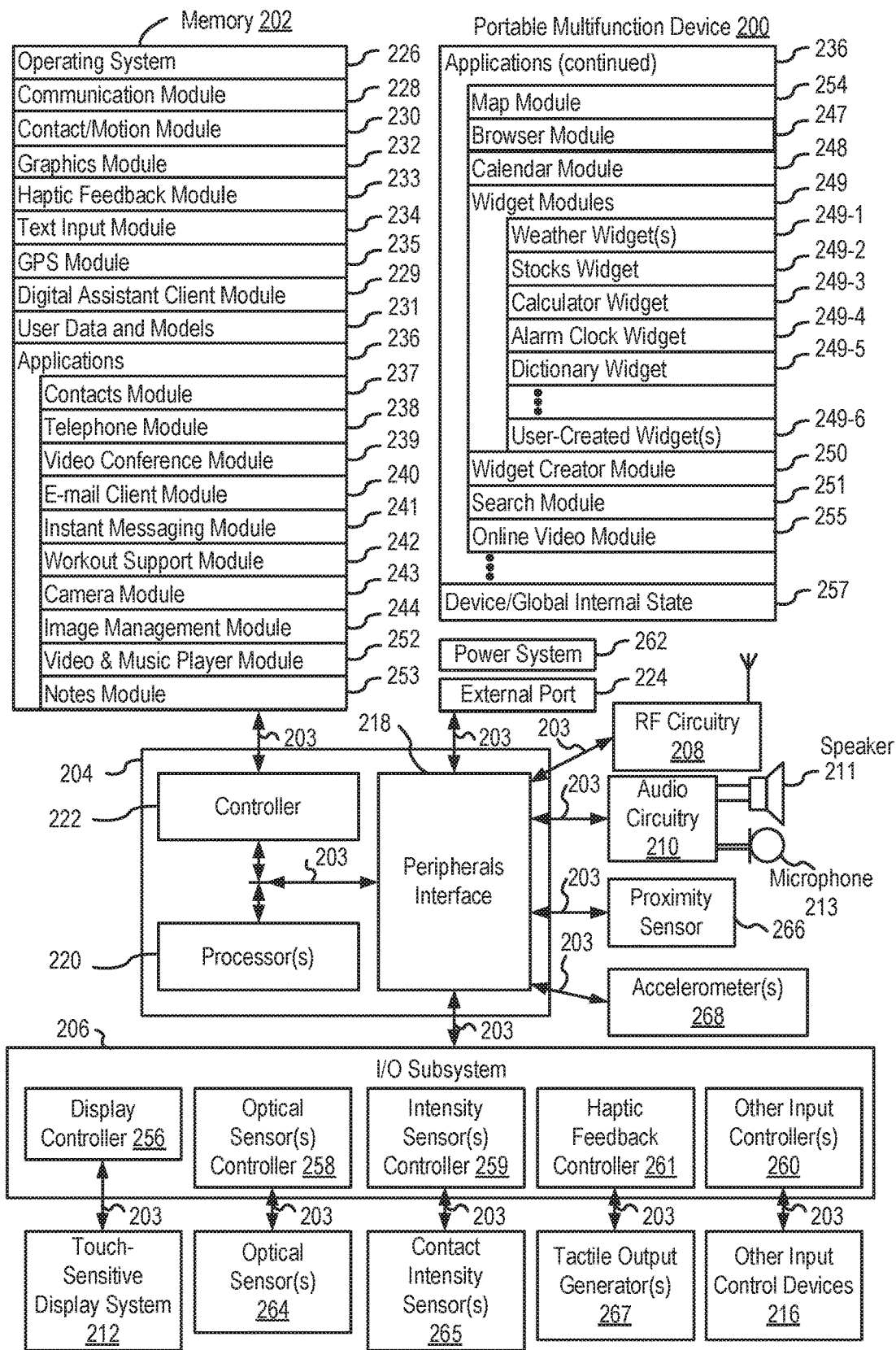
FIG. 2A is a block diagram illustrating a portable multifunction device implementing the client-side portion of a digital assistant, according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 includes one or more computer-readable storage mediums. The computer-readable storage mediums are, for example, tangible and non-transitory. Memory 202 includes high-speed random access memory and also includes non-volatile memory, such as one or more magnetic disk storage devices, flash memory devices, or other non-volatile solid-state memory devices. Memory controller 222 controls access to memory 202 by other components of device 200.

In some examples, a non-transitory computer-readable storage medium of memory 202 is used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) are stored on a non-transitory computer-readable storage medium (not shown) of the server system 108 or are divided between the non-transitory computer-readable storage medium of memory 202 and the non-transitory computer-readable storage medium of server system 108.

Peripherals interface 218 is used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data are retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button disengages a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) turns power to device 200 on or off. The user is able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output includes graphics, text, icons, video, and any combination thereof (collectively termed "graphics"). In some embodiments, some or all of the visual output correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 uses LCD (liquid crystal display) technology, LPD (light emitting polymer display) technology, or LED (light emitting diode) technology, although other display technologies may be used in other embodiments. Touch screen 212 and display controller 256 detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, Calif.

A touch-sensitive display in some embodiments of touch screen 212 is analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 is as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 has, for example, a video resolution in excess of 100 dpi. In some embodiments, the touch screen has a video resolution of approximately 160 dpi. The user makes contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 includes a touchpad (not shown) for activating or deactivating particular functions. In some embodiments, the touchpad is a touch-sensitive area of the device that, unlike the touch screen, does not display visual output. The touchpad is a touch-sensitive surface that is separate from touch screen 212 or an extension of the touch-sensitive surface formed by the touch screen.

Device 200 also includes power system 262 for powering the various components. Power system 262 includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 also includes one or more optical sensors 264. FIG. 2A shows an optical sensor coupled to optical sensor controller 258 in I/O subsystem 206. Optical sensor 264 includes charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 captures still images or video. In some embodiments, an optical sensor is located on the back of device 200, opposite touch screen display 212 on the front of the device so that the touch screen display is used as a viewfinder for still and/or video image acquisition. In some embodiments, an optical sensor is located on the front of the device so that the user's image is obtained for video conferencing while the user views the other video conference participants on the touch screen display. In some embodiments, the position of optical sensor 264 can be changed by the user (e.g., by rotating the lens and the sensor in the device housing) so that a single optical sensor 264 is used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 also includes one or more proximity sensors 266. FIG. 2A shows proximity sensor 266 coupled to peripherals interface 218. Alternately, proximity sensor 266 is coupled to input controller 260 in I/O subsystem 206. Proximity sensor 266 is performed as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 also includes one or more accelerometers 268. FIG. 2A shows accelerometer 268 coupled to peripherals interface 218. Alternately, accelerometer 268 is coupled to an input controller 260 in I/O subsystem 206. Accelerometer 268 performs, for example, as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
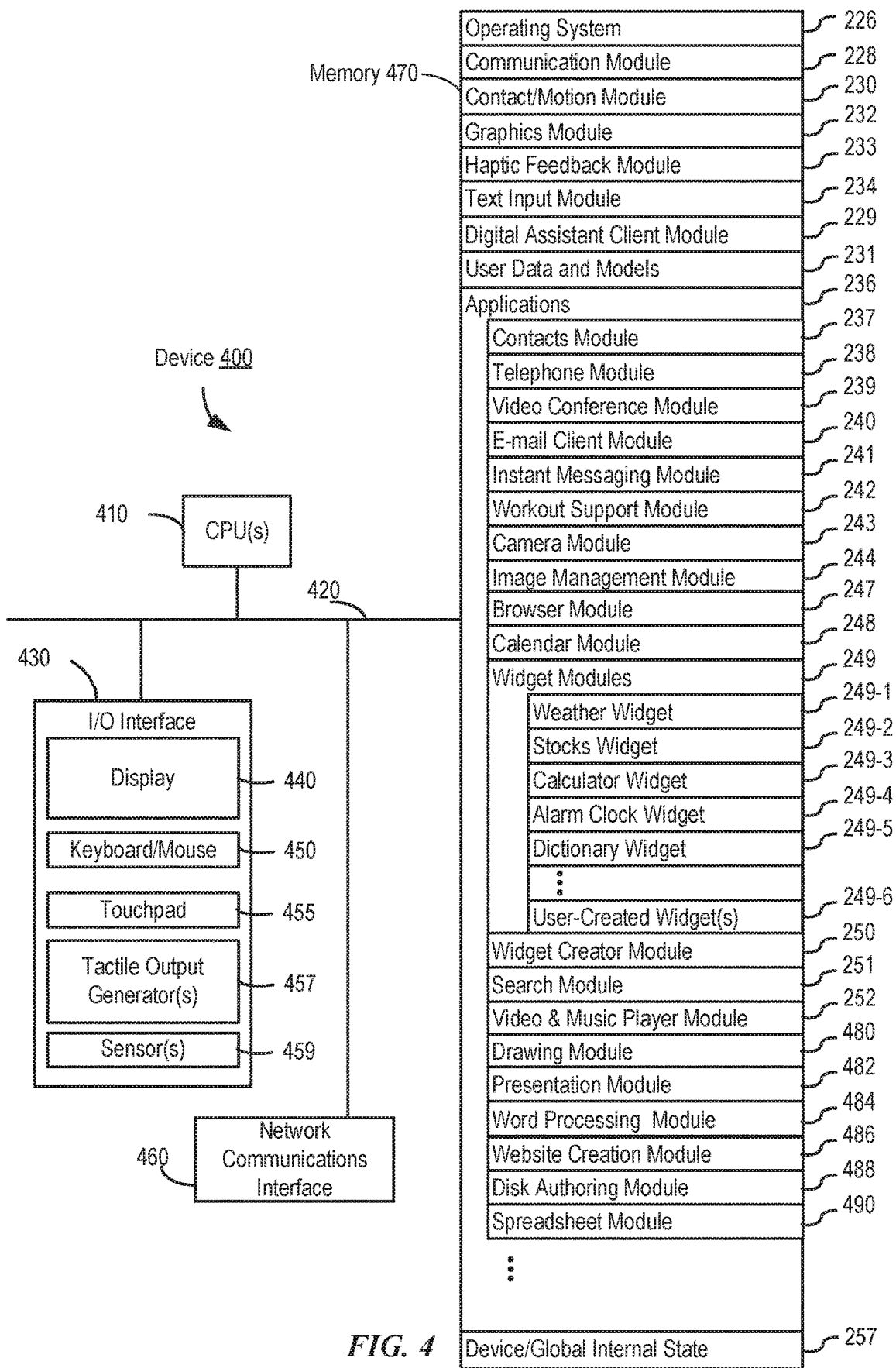
FIG. 4 is a block diagram of an exemplary multifunction device with a display and a touch-sensitive surface, according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 stores data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is, in some examples, a component of graphics module 232, provides soft keyboards for entering text in various applications (e.g., contacts 237, email 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and map/navigation widgets).

Digital assistant client module 229 includes various client-side digital assistant instructions to provide the client-side functionalities of the digital assistant. For example, digital assistant client module 229 is capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 is also capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output is provided as voice, sound, alerts, text messages, menus, graphics, videos, animations, vibrations, and/or combinations of two or more of the above. During operation, digital assistant client module 229 communicates with DA server 106 using RF circuitry 208.

User data and models 231 include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 include various models (e.g., speech recognition models, statistical language models, natural language processing models, ontology, task flow models, service models, etc.) for processing user input and determining user intent.

In some examples, digital assistant client module 229 utilizes the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 provides the contextual information or a subset thereof with the user input to DA server 106 to help infer the user's intent. In some examples, the digital assistant also uses the contextual information to determine how to prepare and deliver outputs to the user. Contextual information is referred to as context data.

In some examples, the contextual information that accompanies the user input includes sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 is provided to DA server 106 as contextual information associated with a user input.

In some examples, the digital assistant client module 229 selectively provides information (e.g., user data 231) stored on the portable multifunction device 200 in response to requests from DA server 106. In some examples, digital assistant client module 229 also elicits additional input from the user via a natural language dialogue or other user interfaces upon request by DA server 106. Digital assistant client module 229 passes the additional input to DA server 106 to help DA server 106 in intent deduction and/or fulfillment of the user's intent expressed in the user request.

A more detailed description of a digital assistant is described below with reference to FIGS. 7A-C. It should be recognized that digital assistant client module 229 can include any number of the sub-modules of digital assistant module 726 described below.

Applications 236 include the following modules (or sets of instructions), or a subset or superset thereof:

Contacts module 237 (sometimes called an address book or contact list);
Telephone module 238;
Video conference module 239;
E-mail client module 240;
Instant messaging (IM) module 241;
Workout support module 242;
Camera module 243 for still and/or video images;
Image management module 244;
Video player module;
Music player module;
Browser module 247;
Calendar module 248;
Widget modules 249, which includes, in some examples, one or more of: weather widget 249-1, stocks widget 249-2, calculator widget 249-3, alarm clock widget 249-4, dictionary widget 249-5, and other widgets obtained by the user, as well as user-created widgets 249-6;
Widget creator module 250 for making user-created widgets 249-6;
Search module 251;
Video and music player module 252, which merges video player module and music player module;
Notes module 253;
Map module 254; and/or
Online video module 255.

Examples of other applications 236 that are stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 238, video conference module 239, e-mail 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 are used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication uses any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that can be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 are used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 are used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can be combined or otherwise rearranged in various embodiments. For example, video player module can be combined with music player module into a single module (e.g., video and music player module 252, FIG. 2A). In some embodiments, memory 202 stores a subset of the modules and data structures identified above. Furthermore, memory 202 stores additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
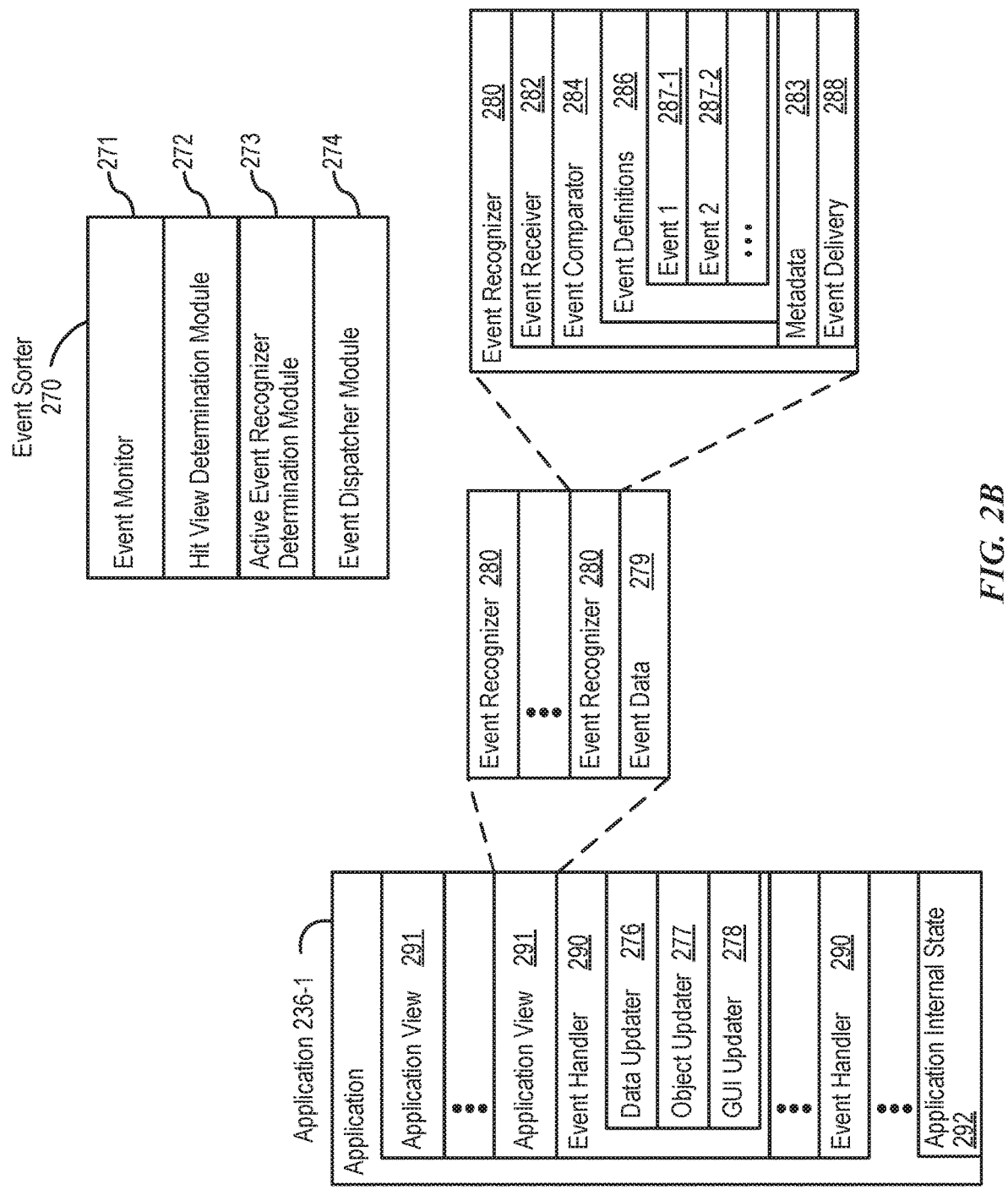
FIG. 2B is a block diagram illustrating exemplary components for event handling, according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected correspond to programmatic levels within a programmatic or view hierarchy of the application. For example, the lowest level view in which a touch is detected is called the hit view, and the set of events that are recognized as proper inputs is determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 utilizes or calls data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
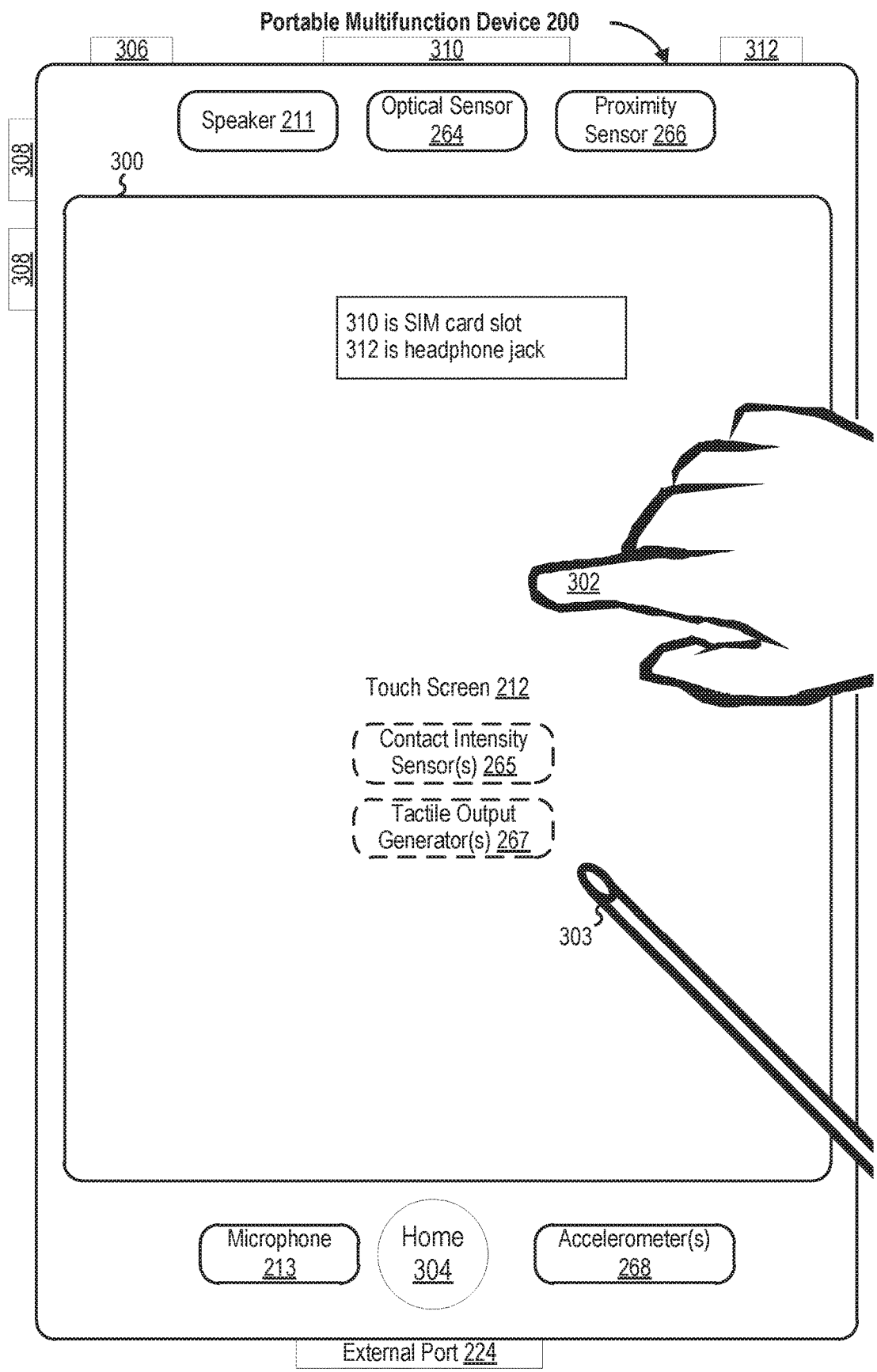
FIG. 3 illustrates a portable multifunction device implementing the client-side portion of a digital assistant, according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 also includes one or more physical buttons, such as "home" or menu button 304. As described previously, menu button 304 is used to navigate to any application 236 in a set of applications that is executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 is, in some examples, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are combined or otherwise rearranged in various embodiments. In some embodiments, memory 470 stores a subset of the modules and data structures identified above. Furthermore, memory 470 stores additional modules and data structures not described above.

Attention is now directed towards embodiments of user interfaces that can be implemented on, for example, portable multifunction device 200.

Figure 5A:
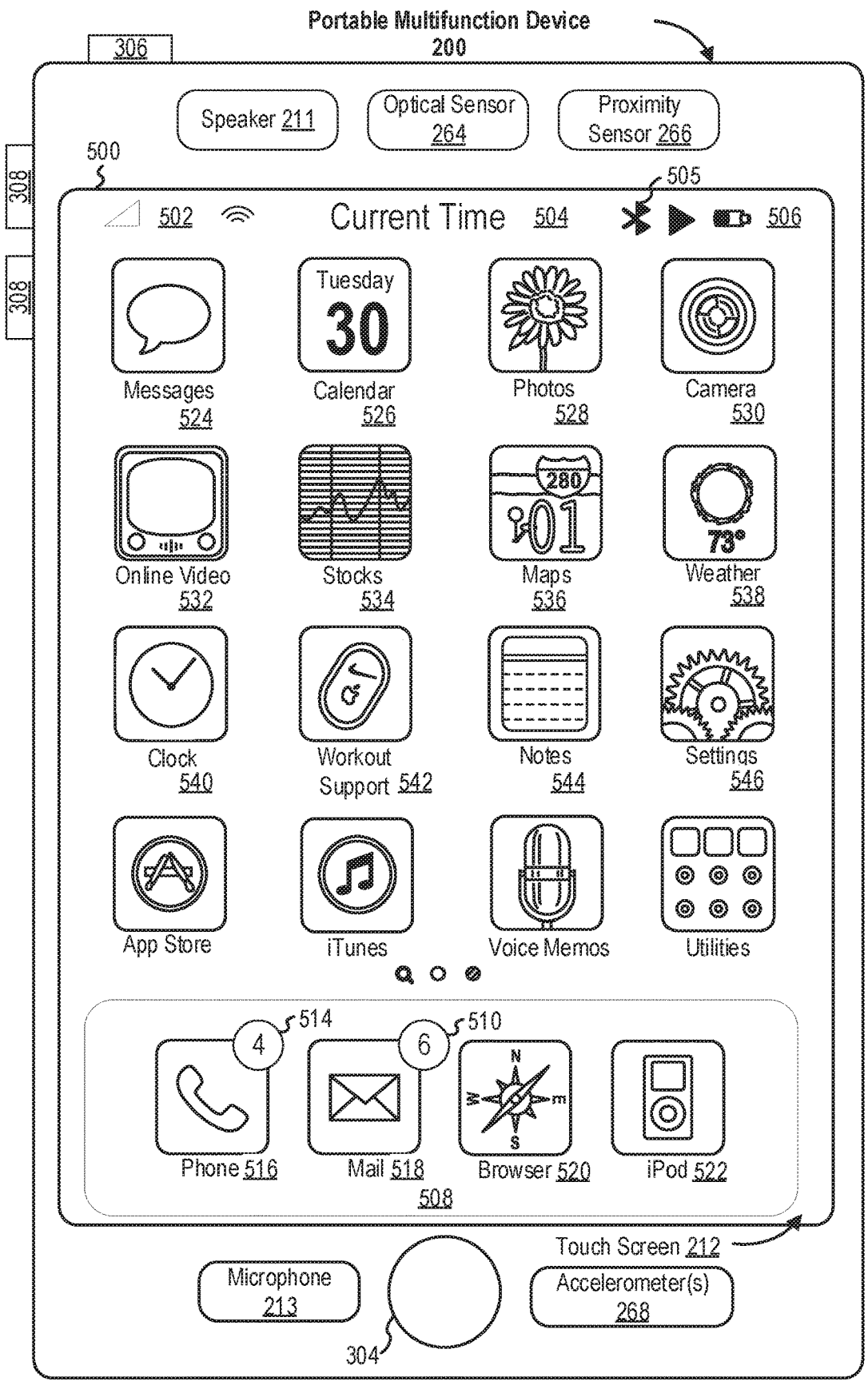
FIG. 5A illustrates an exemplary user interface for a menu of applications on a portable multifunction device, according to various examples.

FIG. 5A illustrates an exemplary user interface for a menu of applications on portable multifunction device 200 in accordance with some embodiments. Similar user interfaces are implemented on device 400. In some embodiments, user interface 500 includes the following elements, or a subset or superset thereof:

Signal strength indicator(s) 502 for wireless communication(s), such as cellular and Wi-Fi signals;
Time 504;
Bluetooth indicator 505;
Battery status indicator 506;
Tray 508 with icons for frequently used applications, such as:
  Icon 516 for telephone module 238, labeled "Phone," which optionally includes an indicator 514 of the number of missed calls or voicemail messages;
  Icon 518 for e-mail client module 240, labeled "Mail," which optionally includes an indicator 510 of the number of unread e-mails;
  Icon 520 for browser module 247, labeled "Browser;" and Icon 522 for video and music player module 252, also referred to as iPod (trademark of Apple Inc.) module 252, labeled "iPod;" and Icons for other applications, such as:
Icon 524 for IM module 241, labeled "Messages;"
Icon 526 for calendar module 248, labeled "Calendar;"
Icon 528 for image management module 244, labeled "Photos;"
Icon 530 for camera module 243, labeled "Camera;"
Icon 532 for online video module 255, labeled "Online Video;"
Icon 534 for stocks widget 249-2, labeled "Stocks;"
Icon 536 for map module 254, labeled "Maps;"
Icon 538 for weather widget 249-1, labeled "Weather;"
Icon 540 for alarm clock widget 249-4, labeled "Clock;"
Icon 542 for workout support module 242, labeled "Workout Support;"
Icon 544 for notes module 253, labeled "Notes;" and
Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 is optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
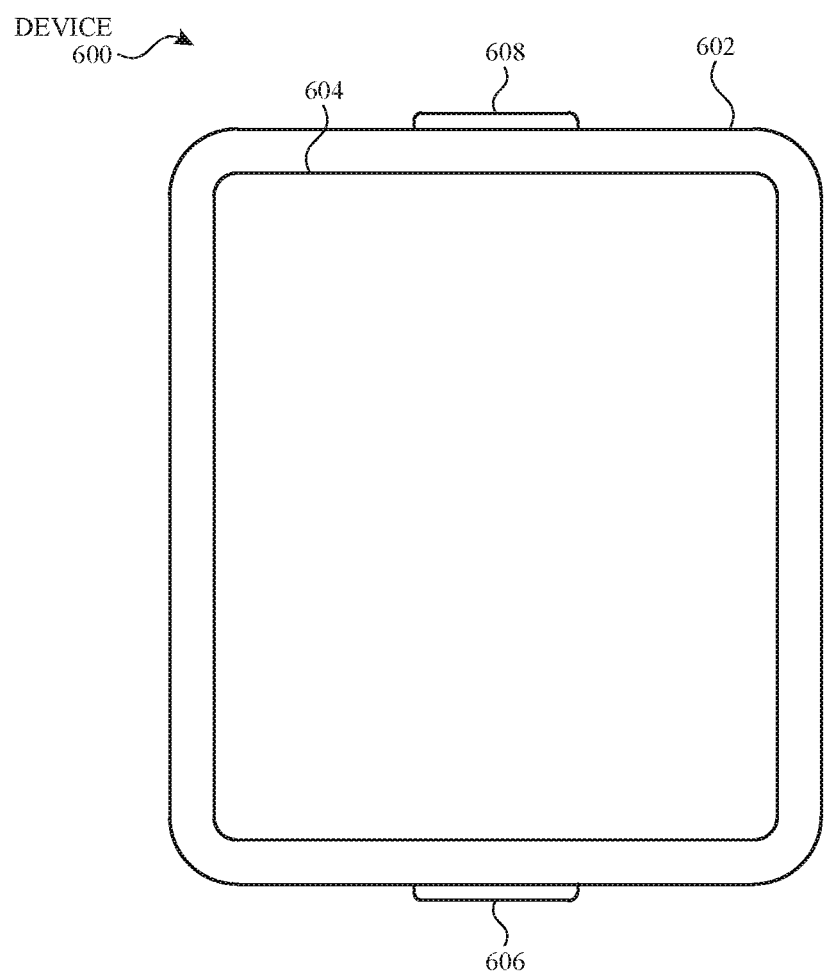
FIG. 6A illustrates a personal electronic device, according to various examples.

FIG. 6A illustrates exemplary personal electronic device 600. Device 600 includes body 602. In some embodiments, device 600 includes some or all of the features described with respect to devices 200 and 400 (e.g., FIGS. 2A-4). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) has one or more intensity sensors for detecting intensity of contacts (e.g., touches) being applied. The one or more intensity sensors of touch screen 604 (or the touch-sensitive surface) provide output data that represents the intensity of touches. The user interface of device 600 responds to touches based on their intensity, meaning that touches of different intensities can invoke different user interface operations on device 600.

Techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, are physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms permit device 600 to be worn by a user.

Figure 6B:
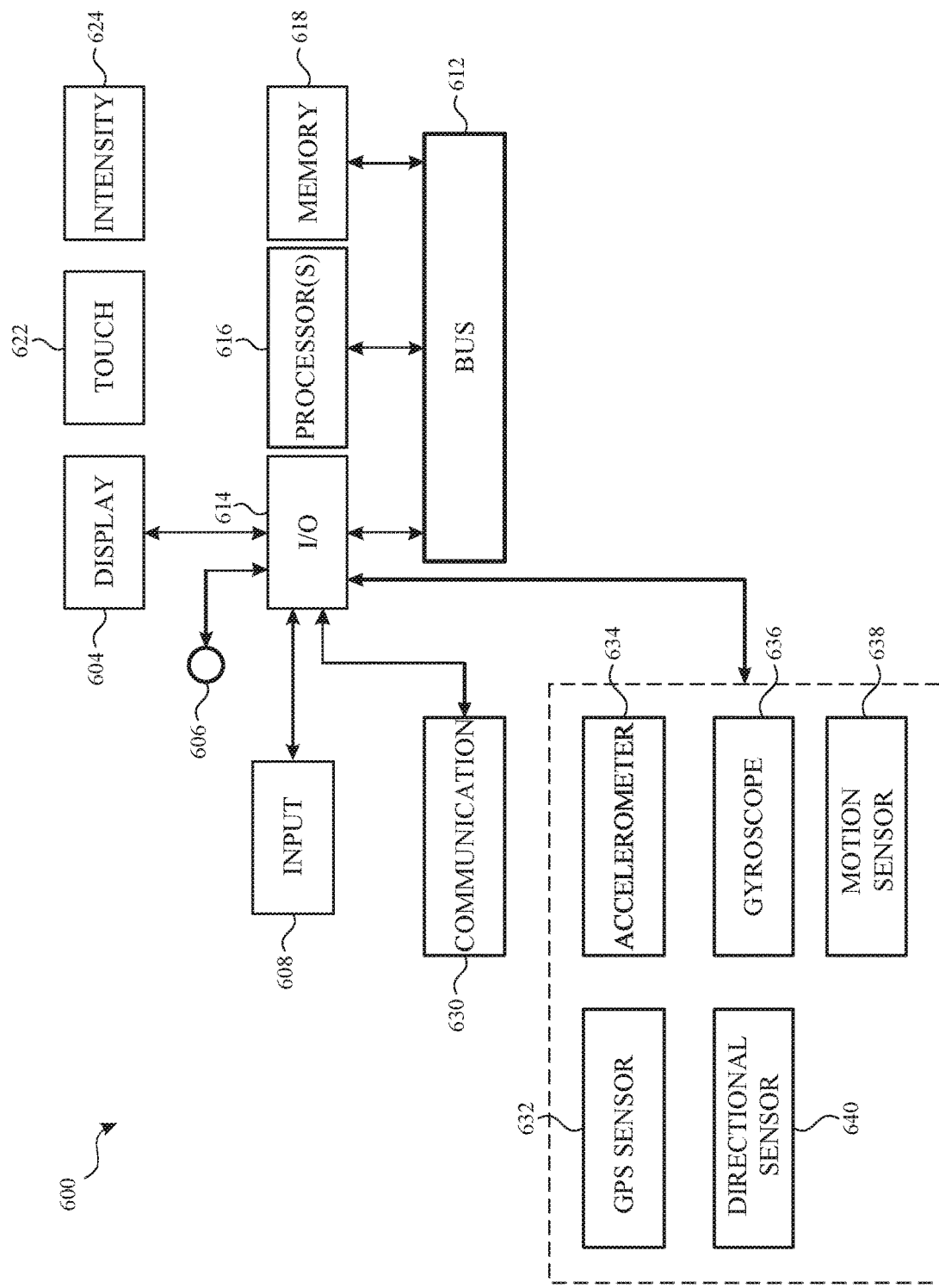
FIG. 6B is a block diagram illustrating a personal electronic device, according to various examples.

FIG. 6B depicts exemplary personal electronic device 600. In some embodiments, device 600 includes some or all of the components described with respect to FIGS. 2A, 2B, and 4. Device 600 has bus 612 that operatively couples I/O section 614 with one or more computer processors 616 and memory 618. I/O section 614 is connected to display 604, which can have touch-sensitive component 622 and, optionally, touch-intensity sensitive component 624. In addition, I/O section 614 is connected with communication unit 630 for receiving application and operating system data, using Wi-Fi, Bluetooth, near field communication (NFC), cellular, and/or other wireless communication techniques. Device 600 includes input mechanisms 606 and/or 608. Input mechanism 606 is a rotatable input device or a depressible and rotatable input device, for example. Input mechanism 608 is a button, in some examples.

Input mechanism 608 is a microphone, in some examples. Personal electronic device 600 includes, for example, various sensors, such as GPS sensor 632, accelerometer 634, directional sensor 640 (e.g., compass), gyroscope 636, motion sensor 638, and/or a combination thereof, all of which are operatively connected to I/O section 614.

Memory 618 of personal electronic device 600 is a non-transitory computer-readable storage medium, for storing computer-executable instructions, which, when executed by one or more computer processors 616, for example, cause the computer processors to perform the techniques and processes described below. The computer-executable instructions, for example, are also stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that is, for example, displayed on the display screen of devices 200, 400, and/or 600 (FIGS. 2A, 4, and 6A-B). For example, an image (e.g., icon), a button, and text (e.g., hyperlink) each constitutes an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location is based on only a portion of the continuous swipe contact, and not the entire swipe contact (e.g., only the portion of the swipe contact at the end location). In some embodiments, a smoothing algorithm is applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Process for Providing Relevant Data Items Based on Context

Figure 7A:
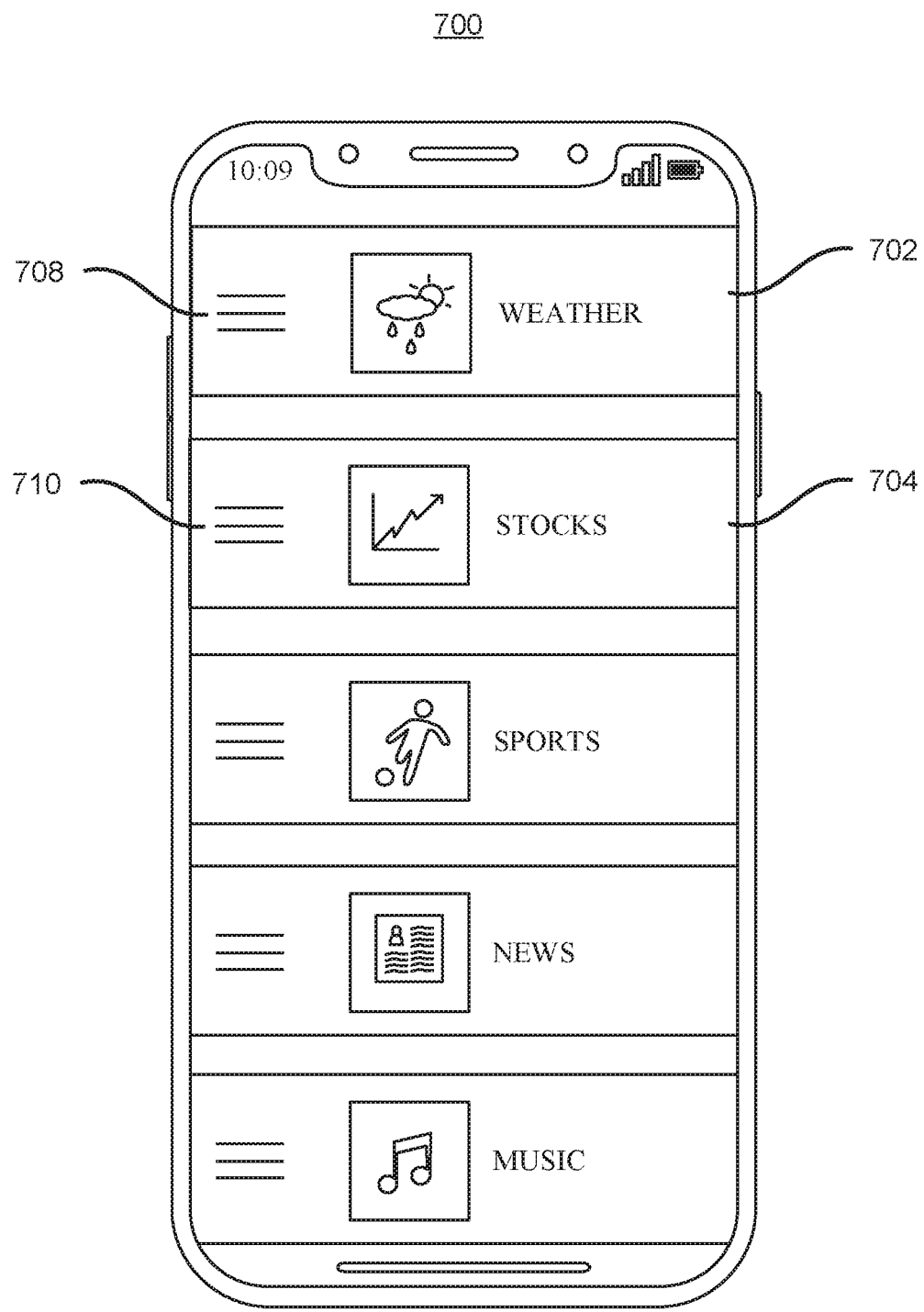
FIGS. 7A-E illustrate a system for providing relevant data items based on context, according to various examples.

FIGS. 7A-E, 8, and 9 illustrate a system for providing relevant data items based on context. For example, as shown in FIG. 7A, electronic device 700 may include any device described herein, including but not limited to devices 104, 200, 400, and 600 (FIGS. 1, 2A, 4, and 6A-B). Thus, it will be appreciated that the electronic devices depicted in FIGS. 7A-E, 8, and 9 may correspond to a user device of any type, such as a phone, laptop computer, desktop computer, tablet, wearable device (e.g., smart watch), and the like. Furthermore, the processes described herein may be performed by a server with information delivered to and from the device, performed on the device, or a combination thereof.

With reference to FIG. 7A, electronic device 700 may display a list of plurality of affordances associated with various data items for selection by a user of the device. In general, the data items may generally correspond to functions of the electronic device, such as a function to open a device application, perform a task on the device and/or another device, and the like. During device operation, the data items may be displayed to the user as a "stack" or "grouping" of data items, for example, on a home screen of the electronic device. For example, data item 702 may be associated with a weather application on the device, and data item 704 may be associated with a stocks application on the device. Affordances for other device applications may be displayed, such as sports, news, music, photos, notes, and the like. In some examples, affordances may be associated with device applications provided by a "third party" developer that may be downloaded to the device (e.g., downloaded for free or for purchase), such as an application for a social media application or a gaming application. In some examples, the data items may correspond to device tasks. For instance, a user may select weather data item 702, which may cause an additional user interface to be displayed including tasks related to weather data item 702. In this example, the additional tasks may involve prompting the user for a specific city in which to check the weather, and/or may involve a user selection of a specific weather task in a specific location (e.g., checking a weather radar, checking weekly high/low temperatures, and the like).

In some examples, a plurality of data items may be selected by the user. For instance, the user may select one or more displayed data items. Once the data items are selected by the user, the user may rank the data items to indicate a relative preference of each data item, or may otherwise specify an order of the data items. As an example, the user may manipulate movement affordances within or proximate to each data item in order to reorder the data items. The user may press and drag movement affordance 708 in order to move weather data item 702 to the highest position in the list of data items. The user may press and drag movement affordance 710 in order to move stocks data item 704 to the second highest position in the list of data items. Such movements may indicate that the user prefers to view the weather data item as a "top" or highest data item in a displayed stack of data items, and prefers to view the stocks data item as a second highest data item in the displayed stack. The user may optionally perform one or more predetermined gesture movements to remove a data item from the list. For example, the user may press and slide a displayed data item to the left or right in order to remove the data item from the displayed list.

In some examples, a plurality of data items may be identified based in part on the user selection. Once the plurality of data items are identified, a plurality of confidence values may be identified, where each confidence value corresponds to a respective data item and indicates a relevance of the respective data item to current context information. The obtained data items may include the data items previously selected by the user. For example, user selection of a data item may result in the data item being automatically included in the identified plurality of data items. In some examples, user selection and placement of a data item may influence the confidence value associated with the selected data item (e.g., a higher placement may correspond to a higher confidence). Identifying data items from the one or more data items may include identifying data items associated with confidence values exceeding a confidence threshold, as discussed further herein. The data items may also be referred to as "widgets," "cards," and the like.

Data items may be identified from one or more data models. The data models may generally correspond to models such as an information model related to applications and/or related tasks, a third party model related to third party application and/or related tasks, and the like. For example, the data models may include one or more client models related to models that provide information associated with one or more client devices, such as a smart phone, tablet, personal computer, home speaker, and the like. For example, a client model may provide information associated with device contacts, calendar information, message information, user-specific media, and the like. The data models may further include application-specific models, such as a weather application data model. Each data model of the plurality of data models may be associated with a model confidence value.

In general, data items may correspond to various suggestions for applications, tasks, or other functions to be performed by the device or by another device. The data items may also correspond to suggestions for information to be viewed by the user (e.g., a breaking news or sports score alert). As an example, various data items may be identified from a weather data model, such as a first weather application, a second weather application downloaded from a third party, a first weather task corresponding to identifying weather in a first city, and a second weather task corresponding to identifying weather in a second city. The weather data model may be associated with a "high" model confidence value (e.g., a level of 80 out of 100). Data items may also be identified from a finance data model, such as a stocks application, a financial news application downloaded from a third party, a banking application downloaded from a third party, and a task corresponding to checking the price of a specific stock. The finance data model may be associated with a "medium" confidence value (e.g., a level of 50 out of 100). Various data items may also be identified from a music data model, such as a first music application, a second music application downloaded from a third party, a task corresponding to playing a specific song using a specific music application. The music data model may be associated with a "low" confidence value (e.g., a level of 30 out of 100).

The model confidence values may be indicative of the general relevance of data items provided by the respective data models. The system may compare model confidence values in order to adjust the relative confidence of various data items. In some examples, the model confidence values may be based at least in part on context information, such as information associated with inputs received at the device (e.g., information received from a microphone, a third party application, another user, etc.), detected state changes on the device (e.g., device orientation and movement, a change in device location, etc.), ambient conditions detected at the device (e.g., light levels, sound levels, pressure levels, proximity to other devices, etc.). In some examples, the context information may be associated with information residing on the user device, such as user preferences, interaction history, general heuristics related to user behavior and predicted user actions, and the like. For instance, prediction of a user's general behavior and actions, such as a user routine, may be achieved by analyzing typical user behavior that occurs, for example, more than a threshold amount of time at specific points in time (e.g., a user may depart from home at a specific time each weekday, may invoke a specific device task upon arriving at a work location, and the like).

In general, a group of data items may be ranked and re-ranked in order to provide the user with one or more highly relevant data item suggestions. The ranking and re-ranking may occur based on adjustment of one or more weights associated with the data items. In particular, the model confidence values may be utilized in order to increase or decrease one or more weights associated with the data items. For example, context information may indicate that a user frequently utilizes finance applications and/or related financial tasks. The context information may also indicate that the user occasionally engages with music-related applications and/or functions, and rarely utilizes sports-related applications and/or functions. Accordingly, data items identified from a finance client model may be given more weight than data items identified from other client models. For instance, confidence values associated with data items identified from the finance client model may be given a higher weight than confidence values associated with data items identified from the music client model. As an example, a data item corresponding to a respective stocks application may have a base confidence value of 50 on a scale of 0 through 100. A data item corresponding to a respective music application may also have a base confidence value of 50 on a scale of 0 through 100. Upon comparison of the model confidence values, the confidence value of the stocks application may increase (e.g., from 50 to 60 or above). In some examples, the confidence value of the music application may be lowered based on the comparison (e.g., from 50 to 40 or lower). Comparison based on additional model confidence values may further influence the amount by which (if any) various confidence values are adjusted. The data item confidence values may also be adjusted in other ways. For example, in accordance with a determination that a model confidence value exceeds a model confidence threshold, confidences values for any data items identified from the respective data model are automatically weighted higher.

In some examples, the data item confidence values may be further adjusted or otherwise influenced based on current context information. Following the example above, a data item corresponding to a stocks application may have a confidence value of 80 and a data item corresponding to a music application may have a confidence value of 40. The identified plurality of data items may further include a data item corresponding to a weather application associated with a confidence value of 50. Context information on the user device may indicate that the user routinely checks the weather when leaving for work each morning. For example, the user may typically open a weather application on the device and provide a spoken input to the device (e.g., "Hey Siri, what's the weather in San Francisco today"), or perform a predefined function for checking the weather in San Francisco (e.g., activating an affordance corresponding to user-customized action for "Weather in San Francisco"). The user may check the weather at a specific time (e.g., generally between 7:00-7:15 AM on weekdays), or may check the weather as the user is leaving home in the morning on weekdays (e.g., as the device location moves away from a "home" location). As a result, based on current context information, the confidence value associated with a respective weather data item may be adjusted. In particular, current context information may indicate a current date/time corresponding to 7 AM on a weekday, and/or that the user departing a home location based on device movements and location information. Accordingly, the device may determine that the typical user action (e.g., invoking a specific weather application) is highly relevant based on the context information. This determination may reflect a high possibility that the user would engage with a weather application or otherwise desire to view weather information given current context. Given this determination, the confidence value associated with the data item corresponding to the specific weather application is increased (e.g., from 50 to 90 or higher).

Once the plurality of data items and associated confidence values are identified, the plurality of data items may be ordered based on confidence value, such as in descending order based on descending confidence values. For example, the data items are identified from the data models, including weight adjustments (if any) based on the model confidences values. The identified data items may include the stocks application having a confidence value of 80 out of 100, the music application having a confidence value of 40 out of 100, and the weather application having a confidence value of 90 out of 100. The data items may therefore be ordered with the weather application as the first data item in the ordered data items, the stocks application as the second data item in the ordered data items, and the music application as the third data item in the ordered data items.

Figure 7B:
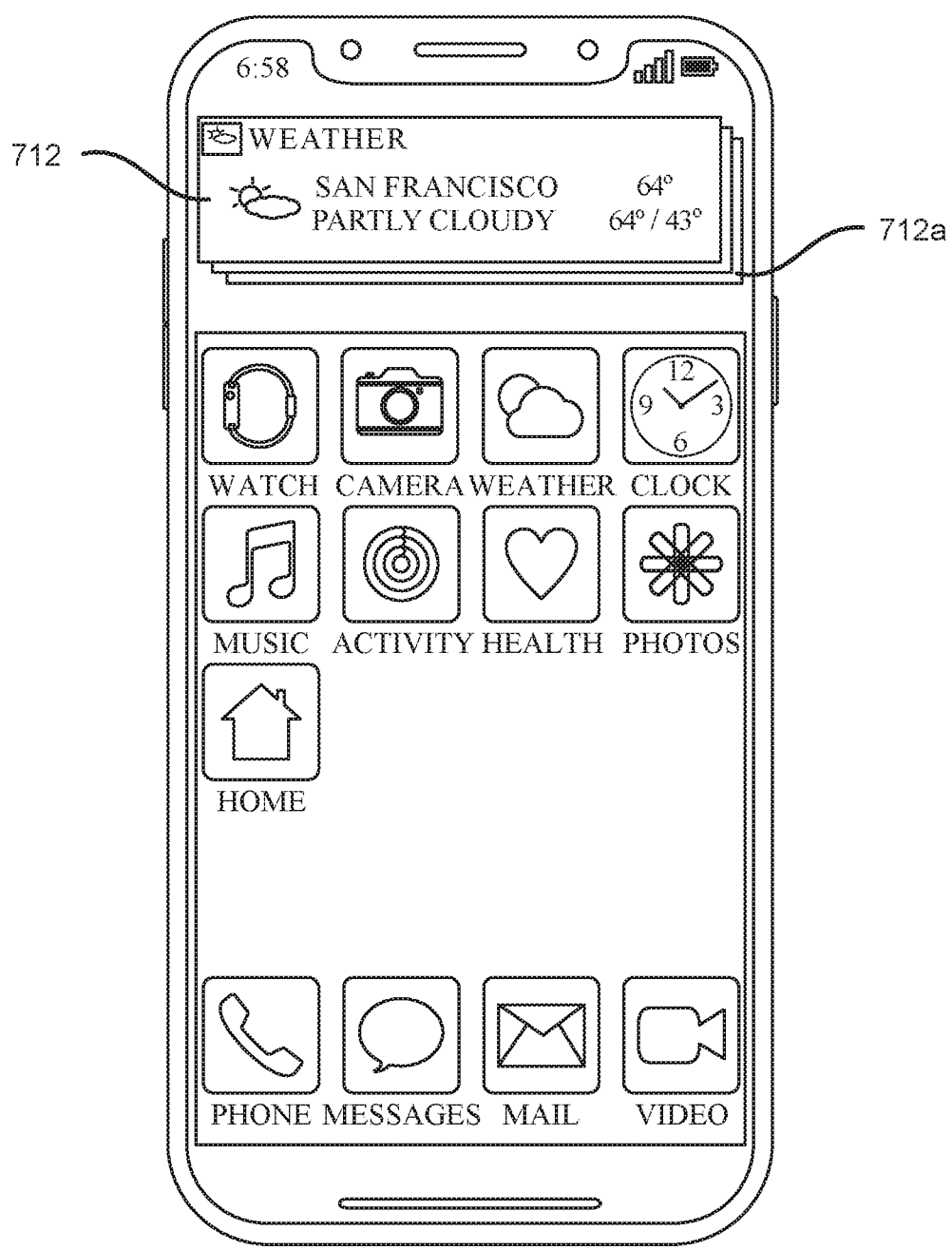

With reference to FIG. 7B, an exemplary "home" screen of electronic device 700 is depicted. The user may navigate to the home screen by unlocking the device, performing a gesture (e.g., swipe up from bottom of display), pressing a button on the device, and the like. Upon navigating to the home screen, data item 712 corresponding to a first data item in a grouping of data items may be displayed. The first data item may correspond to a data item having a highest confidence value of the plurality of data items, such as the weather data item having a confidence of 90 out of 100. The highest confidence value may be indicative of a data item having a highest relevance to current context information. Displayed data item 712 may include additional displayed information related to the respective data item. In this example, the additional information related to the weather data item may include the current conditions (e.g., partly cloudy) in the relevant location (e.g., San Francisco), along with temperature information such as current temperature, and high/low temperatures for the day, and the like. Data item 712 may be displayed as overlaid on a grouping 712*a* of data items in order to indicate to the user that additional data items are available for display. In general, data item 712 and grouping 712*a* may be displayed within a specific area on the home screen, such as a top location as depicted in FIG. 7B. In some examples, data item 712 and grouping 712*a* may be displayed at a bottom location, a left location, a right location, a middle location, or any other location permitting the user to view and interact with the data items. In some examples, the user may configure the location of data item 712 and grouping 712*a*, such as configuring the location of the data items to be displayed at the home of the display screen. As discussed in more detail with respect to FIGS. 8-9 the user may additionally configure a size of the displayed data items.

Figure 7C:
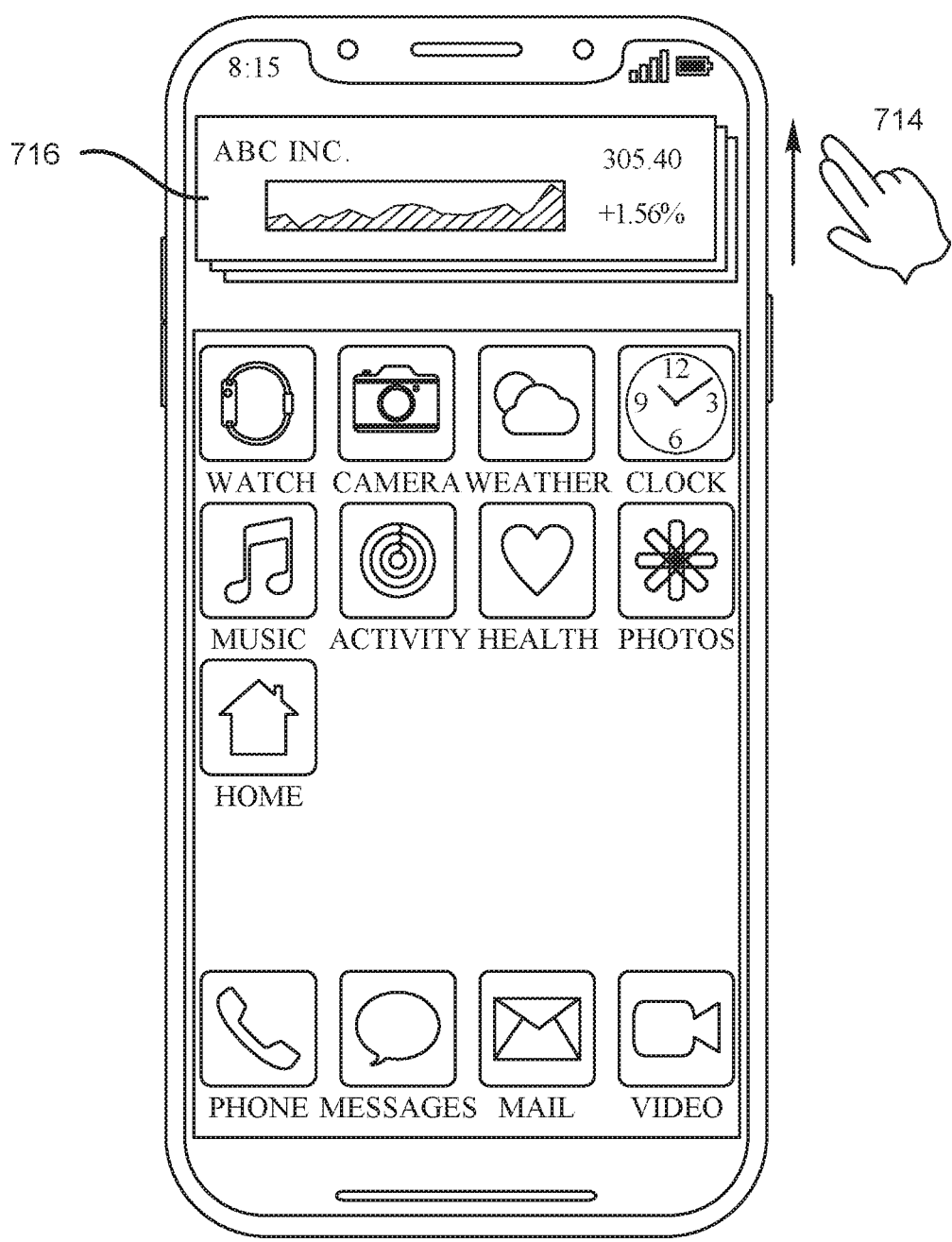

With reference to FIG. 7C, the user may provide various inputs in order to replace the displayed data item with a newly displayed data item within the displayed grouping of data items. For example, the electronic device may receive a user input 714 corresponding to a contact motion in a first direction (e.g., a swipe up motion proximate to or on displayed data item 712). In response to user input 714, data item 716 corresponding to a second data item may be displayed as replacing displayed data item 712. For instance, data item 716 may correspond to the data item in the plurality of data items having the next lowest confidence value relative to the data item 712, such as the second data item corresponding to the stocks application. The displayed data item 716 corresponding to the stocks application may include additional displayed information corresponding to the data item, such as a company name, current stock price, daily percentage movement, historical stock price information (e.g., current day, week, month, year, etc.).

The user may provide additional user inputs to replace the displayed data item with a newly displayed data item in the displayed grouping. For example, the user may provide a second user input including a contact motion in a second direction opposite the first direction (e.g., a swipe down motion proximate to or on displayed data item 716). In response to the second user input, a data item may be displayed replacing the current displayed data item. In this example, the displayed data item may correspond to the data item in the plurality of data items having the next highest confidence value relative to the data item 716, such as the first data item corresponding to the previously displayed weather application. In some examples, the confidence values associated with the plurality of data items are updated based on the user inputs. For example, a currently displayed data item may be considered most relevant if the user rotates to the data item and does not continue to rotate to a different data item (e.g., pauses and views the data item, activates the data item to launch an application or perform a task, etc.). In response to user actions indicating the data item has relevance, the confidence value of the respective data item may be increased. For example, the confidence value may be increased at any future time when the future context information is consistent with the current context information.

In some examples, updated context information associated with the electronic device is received, where an updated plurality of confidence values is detected based on the updated context information. In general, the data items confidence values may be based in part on an association between respective data items and various aspects of the context information. Current information associated with a device application, for example, may influence various confidence values. For instance, a user may have previously indicated, via the stocks application corresponding to data item 716, that "ABC Inc." is a favorite company of the user. Accordingly, any movement of "ABC Inc." stock satisfying a threshold movement (e.g., greater than 1% increase or decrease) may increase the confidence value associated with data item 716 corresponding to the stocks application, as described herein. Current information associated with a device application may correspond to a variety of information, such as a rideshare status. For example, the user may have reserved a vehicle through a ridesharing application, such that the current information includes application updates regarding the status of the reservation (e.g., "Your driver is on the way," "Driving arriving in five minutes," etc.). The user may utilize a home automation and security system including a "home" application on the electronic device. In this case, the current information may additionally include home automation and security system notifications (e.g., "Motion detected in Living Room," "Front Door Opened," "Basement Temperature Set to 70 Degrees," etc.). Current information may also be associated with a variety of other events such as sports scores, breaking news notifications, food delivery status updates, and the like.

In some examples, updated user preferences and/or user interaction history may influence various confidence values. For example, user interaction history may indicate that the user has recently downloaded and has frequently used a news application. During periods of typically low device activity (e.g., early or late hours of the day, overnight, during lunch/dinner hours, etc.), confidence values of various data items in the plurality of data items may be relatively low. Given the recent usage history associated with the news application, the confidence value associated with the news application may be increased, especially when confidence values of various other data items are low given current context information. In some examples, a user may input various preferences for a specific application, such as turning on/off notifications for a third party application. In response to receiving a user preference for turning on/off on notifications for a respective application, the confidence value for a data item corresponding to the application may be increased or decreased appropriately.

In some examples, a location of the electronic device may influence various confidence values. In particular, one or more confidence values may be based in part on an association between a respective data item and a location of the electronic device. For example, data items associated with calendar events may include parameters for an event location, such as a specific physical address. The electronic device may detect movement of the device to a specific location, such as a location in proximity of the physical address. In accordance with a determination that the data item associated with a calendar event includes an association with the specific location in proximity of the physical address, confidence value of the data item is increased. The confidence value of other data items be based on an association between the data item and a location of the electronic device, such as a "Home" application (e.g., for performing functions related to home appliances or system, such as heating/cooling, media, security, etc.) associated with the location of a user's home.

Based on the updated context information, the updated plurality of confidence values may include a third confidence value associated with a third data item. In accordance with a determination that the third confidence value is higher than a confidence value corresponding to a displayed data item, the order of the plurality of data items is modified. As an example, confidence values may be further based on an association between a respective data item and a calendar event. The calendar event may include a start time (e.g., 10:00 AM on the current day). A start time of the calendar event may be within a threshold time (e.g., within 15 minutes). In accordance with a determination that any calendar events, or a subset of calendar events (e.g., events on a work-related calendar, a calendar shared with a specific contact, etc.), are within a threshold time of the current time, a confidence value for an appropriate data item is increased. In particular, in this example, a confidence value for data item corresponding to a calendar application is increased (e.g., increased from 30 to 100).

Modifying an order of the plurality of ordered data items may include modifying an order value of each of the data items. Continuing with the above example, prior to retrieving the updated context information, the plurality of ordered data items may have included a first displayed data item corresponding to the weather application having a confidence value of 90 out of 100 (order of 1), a second data item corresponding to a stocks application having a confidence value of 80 out of 100 (order of 2), a third data item corresponding to a music application having a confidence value of 40 out of 100 (order of 3), and a fourth data item corresponding to a calendar application having a confidence value of 30 out of 100 (order of 4). Upon retrieving the updated context information, the order value of each data item may be modified, such that the order values are arranged in descending order based on a descending order of the updated confidence values. As a result, the updated plurality of ordered data items may include a first data item corresponding to the calendar application having a confidence value of 80 out of 10 (order of 1), a second data item corresponding to the weather application having a confidence value of 60 out of 100 (order of 2), a third data item corresponding to the stocks application having a confidence value of 40 out of 100 (order of 3), and a fourth data item corresponding to a music application having a confidence value of 20 out of 100 (order of 4).

Figure 7D:
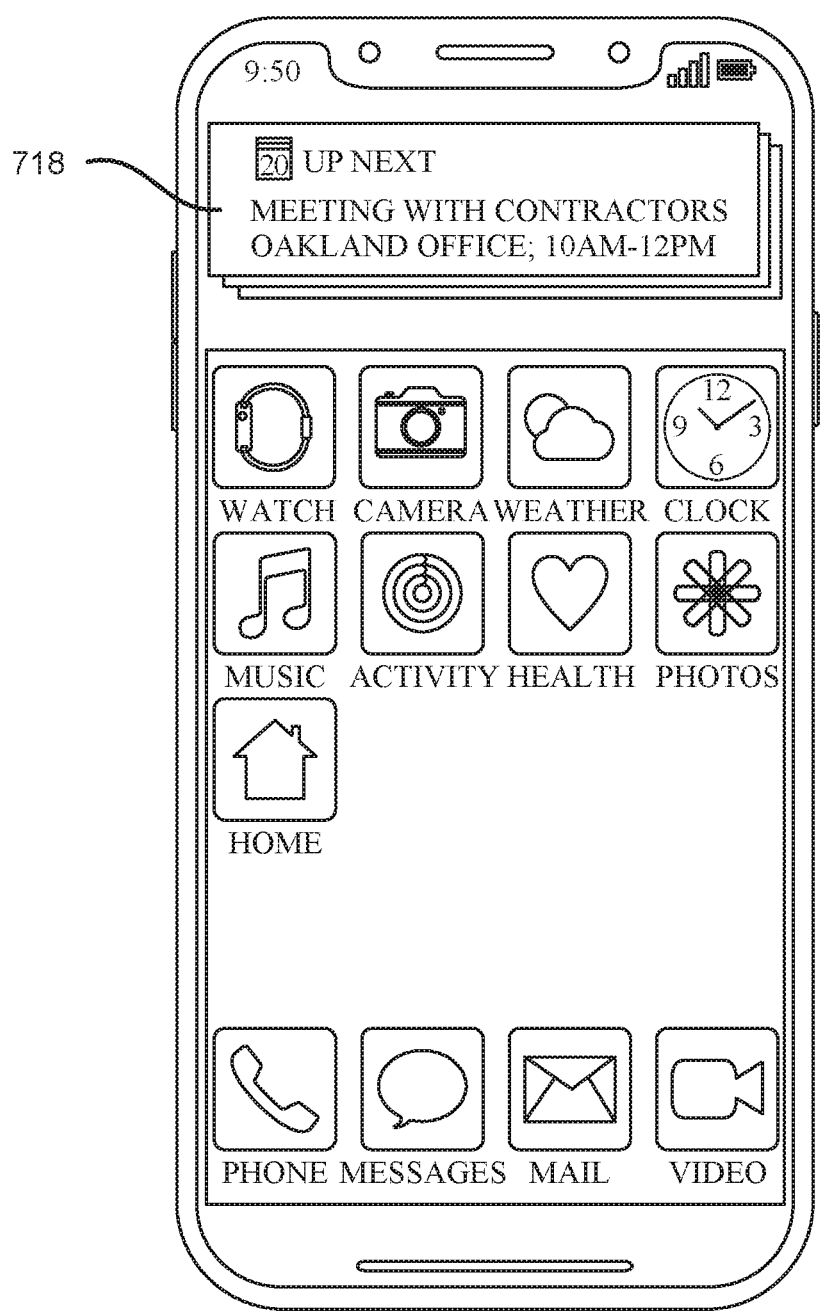

With reference to FIG. 7D, the data item having a highest confidence value based on the modified order of the plurality of data items is displayed, such as data item 718 corresponding to a calendar event from a calendar application. As noted above, data item 718 having a highest confidence value may be indicative of a data item having a highest relevance to current context information. For example, data item 718 may correspond to the calendar application, and may include additional information related to an event (e.g., one or more events within a threshold time from a current time). The additional information may include a meeting title, such as "Meeting with Contractors," a meeting start time and/or time range, such as "Today from LOAM to 12 PM," and other relevant event information. In this example, data item 718 corresponding to the calendar event may be displayed as a result of an association between an event related to the calendar data item and a current location of the user device, such as a location proximate to a respective office in Oakland, Calif. For instance, the calendar event may be scheduled for "Meeting with Contractors," including a location of "Oakland Office" corresponding to the respective office. In general, data item 718 may become the data item with the highest confidence value of the plurality of data items once the user reaches the location proximate to the respective office. In some examples, data item 718 may be identified based on the start time of the calendar event (e.g., 10 AM) being within a threshold of a current time (e.g., 10 minutes from 9:50 AM). Accordingly, data item 718 may become the data item with the highest confidence value of the plurality of data items once the user reaches the location proximate to the respective office and/or once the event start time is within a threshold time from the current time. Accordingly, data item 718 may be displayed upon the user unlocking the device and navigating to the home screen. In some examples, data item 718 may be displayed as replacing a previously displayed data item (e.g., data item 716 of FIG. 7C) while the user is viewing the home screen.

Upon a data item replacing a displayed data item based on updated context information, the user may continue to scroll or otherwise rotate through the grouping of displayed data items. For example, the electronic device may receive a user input corresponding to a contact motion in a specific direction (e.g., a swipe up motion proximate to or on displayed data item 718, or a swipe down motion proximate to or on displayed data item 718). In response to the user input, an additional data item may be displayed as replacing displayed data item 718 (not depicted). In general, the data item displayed as overlaid on the grouping of data items may continue to be displayed until a user input is received including a request to remove the data item and the grouping from the display (e.g., a left or right swipe gesture, a change in user preference, and the like). Additionally, the order values of the plurality of data items may be further modified, such that the modified order value of the additional data item may correspond to the highest order value of the plurality of ordered data items. In some examples, order values of the plurality of data items are not further modified until a specific user action that indicates modified relevance of the plurality of data items. For example, once the user rotates to a specific data item and pauses on the data item for greater than a threshold period of time, determination is made that the order values should be modified.

Figure 7E:
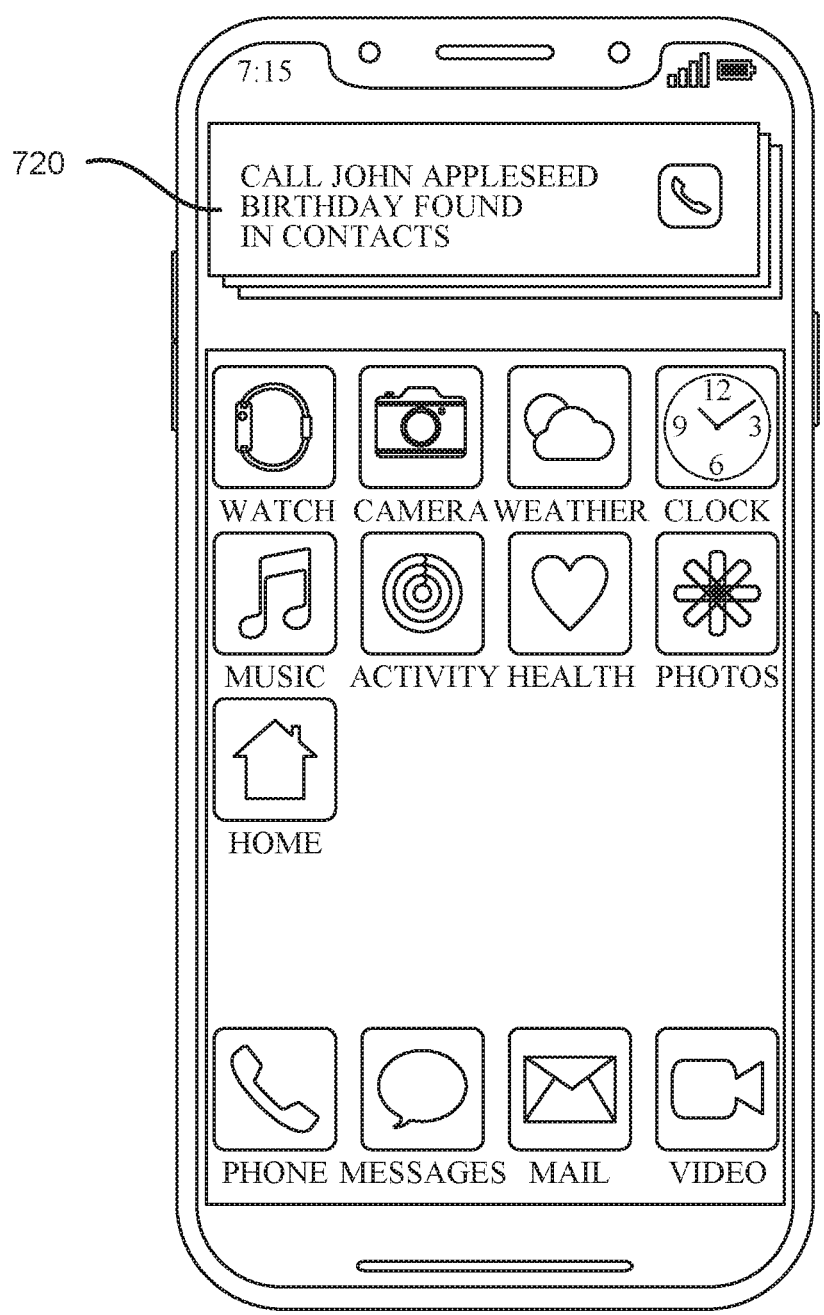

With reference to FIG. 7E, an additional data item not included in the plurality of data items may be added to the plurality of data items based on the updated context information. In particular, the additional data item may not have been initially selected by a user for inclusion in the plurality of data items. The updated context information may include information related to various events or other conditions, such as reminders regarding conference call dial-in numbers, birthday/anniversary information associated with device contacts, battery level information for the electronic device or additional devices (e.g., wireless headphones, smart watch, etc.), turning on vibrate/do-not disturb/silent settings, and the like. The updated context information may further include predictions for potential user actions, such as sending a message including "Running Late" to a group associated with a calendar event, calling a specific contact, and the like. For example, the electronic device may include data item 720 for a telephonic birthday reminder associated with a stored contact with the name "John Appleseed" having a birthday of Jun. 5, 1980 (e.g., the birthday information being saved with the contact information or otherwise accessible by the device). Data item 720 may initially be associated with a confidence value of 0 out of 100. The updated context information may include an updated date and time of 7:15 AM, Jun. 5, 2020. For example, the updated context information may be retrieved continuously, or may be retrieved upon the user unlocking the device (e.g., updated when the user unlocks the device in the morning). Based on the updated context information, the confidence value associated with data item 720 may increase (e.g., from 0 out of 100 to 70 out of 100).

In some examples, determination is made whether the confidence value associated with the additional data item exceeds a confidence threshold. The confidence threshold may include a predetermined or dynamically adjusted threshold, or may alternatively or additionally be set based on an average or composite confidence value of the plurality of data items. For example, the plurality of data items may include a stocks application having a confidence value of 70 out of 100, a navigation task for routing to a "work" location having a confidence value of 60 out of 100, and a task for turning on a "do not disturb" setting having a confidence value of 20 out of 100. The confidence threshold may be determined based on the average confidence value of the plurality of data items, such as 50. Accordingly, in accordance with a determination that the confidence value of data item 720 exceeds the confidence threshold of 50, data item 720 is added to the plurality of data items. Furthermore, since data item 720 has a highest confidence value of the plurality of confidence values, data item 720 may be displayed as replacing a currently displayed data item, as illustrated in FIG. 7E.

Identifying an additional data item may further include receiving an input corresponding to at least one of a user interaction history and a movement history of the electronic device, and predicting a user action based on the input. For example, the user may typically beginning a running workout activity via a fitness application at 6 AM on weekdays. Based on the user interaction history, an additional data item related to a task for beginning a running workout activity may have an increased confidence value at 6 AM (or at times proximate to 6 AM) on weekdays. Identifying an additional data item may further include obtaining at least one of information associated with a device application and information from a remote source, and identifying a corresponding notification based on the information. As an example, the user may have previously reserved a flight from San Francisco to Boston, such that the flight information may be retained on an airline application on the device. The airline application may provide updated information regarding the flight, such as a delayed depart time. The notification may include information that is easily glanceable by the user, such as "Flight Number 34 to New York City Delayed One Hour." Accordingly, a data item including a notification with the delayed flight information may be identified and associated with high confidence when the information is obtained. Identifying an additional data item may also include identifying a prediction of a device application. For example, the user may be visiting a historic location or otherwise significant event. As a result, a data item associated with camera application may be identified in order allow the user to capture media of the location or event.

In some examples, in accordance with a determination that no confidence value of the plurality of identified confidence values exceeds a confidence threshold, an additional data item is identified, the additional data item associated with a usage value. In general, various tasks or other applications on the device may be used less frequently than other tasks and applications. For example, the user may rarely use a "Home" application associated with tasks related to home-automation, networked home appliances, home security, and the like. The usage value associated with the "Home" application may thus be low (e.g., 5 out of 100). When no confidence value of the plurality of identified confidence values exceed a confidence threshold, determination is made that the "Home" application usage value does not exceed a usage threshold (e.g., a threshold of 10 out of 100). Accordingly, an additional data item corresponding to the "Home" application or a task related to the home application (e.g., "Turn on living room lights") may be added to the plurality of data items. As a result, the additional item may be displayed as replacing the currently displayed data item based on the confidence value of the additional data item being the highest confidence value of the plurality of confidence values. Alternatively, the additional data item may be eventually displayed as the user scrolls or otherwise rotates through the grouping of data items displayed on the display.

Turning now to FIG. 8, a process 800 for selecting an arrangement of data items is illustrated. In general, the data items displayed to the user may be associated with various display sizes. For example, multiple data items may be displayed to a user concurrently, such as via a "home screen" displayed on the electronic device, as discussed in more detail with respect to FIG. 9. In particular, the multiple data items may be arranged and presented to the user based on various factors as described herein. For example, a first data item arrangement 802 may include a first displayable data item 804 including a single data item 804*a*. Data item 804*a* may have a corresponding display size of two units by four units. Each unit may correspond to a respective display area (e.g., a predetermined number of pixels per unit). The first data item arrangement 802 may further include a second displayable data item 806 including a data item 806*a* and four data items 806*b*. Data item 806*a* may have a corresponding display size of two units by two units, whereas the data items 806*b* each have corresponding display size of one unit by one unit. The first data item arrangement 802 may further include a third displayable data item 808 including two data items 808*a* and four data items 808*b*. Data items 808*a* may each have a corresponding display size of one unit by two units, whereas the data items 808*b* each have corresponding display size of one unit by one unit.

Once a first plurality of data items are identified, a second plurality of data items may be identified from the first plurality of data items in order to select an arrangement of data items for display. In general, the second plurality of data items may be selected based on a high confidence value. In particular, each data item of the second plurality of data items associated with an item confidence value exceeding a predetermined threshold value may be selected. The predetermined threshold value may correspond to a specific percentile of the composite confidence values from the first plurality of data items. As an example, the first plurality of data items may include 40 data items, and confidence values of the first plurality of data items may range from 5 out of 100 to 95 out of 100. The $60^{th}$ percentile of the confidence values may correspond to a 75 out of 100 confidence value, such that 16 data items include a confidence value equal to or greater than 75, and 24 data items include a confidence value less than 75. Accordingly, the predetermined threshold value may corresponds to 75 out of 100, and the second plurality of data items include the 16 data items with a confidence value of 75 or greater.

In some examples, identifying the second plurality of data items includes determining a similarity score based on first and second data items exceeding the predetermined threshold. In particular, the similarity score may be indicative of duplicative or otherwise substantially similar data items within the first plurality of data items. As an example, a first data item may correspond to a weather application and a second data item may correspond to a task for checking the weather in San Francisco. Based on a determination that the data items correspond to the same domain (e.g., a weather domain), the similarity score may be increased. Furthermore, based on a determination that the task correspond to the same application (e.g., selection of the task would invoke the weather application), the similarity score may be increased.

Other factors may be used to adjust or otherwise determine the similarity score, such as the result of performing a task. For example, a first data item may correspond to a task for playing a song on the electronic device (e.g., a mobile phone) using a first application, whereas the second data item may correspond to a task for playing a song on another electronic device (e.g., a surround sound system) using a second media application. In this example, while both tasks may relate to the same domain (e.g., media, music, etc.), the similarity score may not exceed the predetermined threshold given the usage of different target devices. In some examples, in accordance with a determination that the similarity score exceeds a similarity threshold, the first data item or the second data item is not included in the second plurality of data items. For example, the data item having a higher confidence value may be included while the data item having the lower confidence value may be excluded.

In some examples, a data item is excluded from the second plurality of data items based on a similarity score between the data item and a displayed affordance. For example, the data item may correspond to a weather application (e.g., such as displayed data item 712 in FIG. 7B). The user may have arranged affordances on a home screen of the device (or a currently displayed screen), such as affordances for invoking various applications. One of the affordances on the home screen may be associated with a weather application (e.g., the same weather application corresponding to the data item or a similar weather application). Similar to the determination above, in accordance with a determination that the similarity score exceeds a similarity threshold, the first data item is not included in the identified second plurality of data items based on the similarity to the application affordances on the home screen.

In general, the system may favor displaying a greater amount of information to a user than a lesser amount of information. In particular, various subsets of data items of the second plurality of data items may be determined, wherein the data items within the subsets each correspond to the same displayed size. Data items within each subset may further be weighted based on the displayed size corresponding to the data items with the subset. As an example, in accordance with a determination that a first display size is smaller than a second display size, each data item of the first subset is weighted higher than each data item of the second subset. With reference back to FIG. 8, for example, data items 806*b* and 808*b*, each having a size of one square unit, may each be identified as a first subset having a first weight (e.g., weight of 4, with 4 being the highest weight). Data items 808*a*, having a size of two square units, may each be identified as a second subset having a second weight (e.g., weight of 3). Data item 806*a*, having a size of four square units, may be identified as a third subset having a third weight (e.g., weight of 2). Data item 804*a*, having a size of eight square units, may be identified as a fourth subset having a fourth weight (e.g., weight of 1, with 1 being the lowest weight). There may be additional units contained within the subsets in some examples. Accordingly, the data items may each be weighted based on respective weights associated with the subsets. For example, data item 804*a* may be associated with a weight of 1 and data items 806*b* and 808*b* may be associated with weights of 4.

Selecting an arrangement of the data items may generally include identifying a predetermined display item size. The display item size may correspond to the size of a displayed data item, such as the size of a displayable data item. For example, the predetermined display item size may correspond to the size of displayable data items 804, 806, and 808, such as eight square units. A high-confidence subset of the second plurality of data items may be identified, wherein each data item of the high-confidence subset is associated with an item confidence value exceeding a second predetermined threshold value (e.g., data items having confidence values in the top 10% of data items within the second plurality of data items). In particular, the high-confidence subset may be identified once weights are applied to the data items based on the relative display sizes of the data items, and/or once duplicative or redundant data items are removed from the plurality of data items. In some examples, a plurality of display sizes corresponding to data items of the subset are combined, where the combined display size is less than or equal to the predetermined display item size. For example, data items 804*a*, 806*a*, 806*b*, 808*a*, and 808*b* may be identified as a high-confidence subset of data items associated with an item confidence value exceeding a second predetermined threshold value. The combined display size of data items 804*a*, 806*a*, 806*b*, 808*a*, and 808*b* may be 24 square units. In particular, the predetermined display item size may correspond to the total size of displayable data items 804, 806, and 808, which may be 24 square units.

Once the combined display sizes are determined, a plurality of respective data items may be provided as a candidate arrangement, such as candidate arrangement 810. Candidate arrangement 810 may include displayable data items 812, 814, and 816. Displayable data item 812 may include data items 812*a* and 812*b*. Data items 812*a* and 812*b* may be associated with the highest confidence values (weighted or unweighted) of the high-confidence subset. As a result, data items 812*a* and 812*b* may be displayed to the user within displayable data item 812 as the "top" data item on the grouping of data items, as discussed in more detail with respect to FIG. 9. Similarly, data item 814*a* may be associated with the next highest confidence value of the high-confidence subset (e.g., lower than the confidence values of data items 812*a* and 812*b*), and may be displayed to the user within the second displayable data item 814 in the grouping of data items (e.g., the user may provide a single contact motion to "swipe" to displayable data item 814 from displayable data item 812). Data items 816*a* and 816*b* may be associated with the next highest confidence values of the high-confidence subset (e.g., lower than the confidence values of data items 812*a*, 812*b*, and 814*a*), and may be displayed to the user within the third displayable data item 816 in the grouping of data items (e.g., the user may provide two contact motions to "swipe" to displayable data item 816 from displayable data item 812).

In some examples, a plurality of candidate arrangements are obtained, and a score associated with each candidate arrangement is obtained. The score may be influenced based on various factors, such as proximity of specific data items to other data items. For example, a score may be decreased when an arrangement includes a displayable data item having a data item for a task and a data item for an application associated with the task (e.g., a task for "Call Dad" and an application for "Phone"). In some examples, a score may be increased when an arrangement includes an even variety of display item sizes (e.g., equal or roughly equal numbers of one square unit sizes, two square unit sizes, four square unit sizes, and eight square unit sizes). Once the scores of the candidate arrangements are identified, a candidate arrangement having a highest score is selected for use as the grouping of data items displayed to the user.

Figure 9:
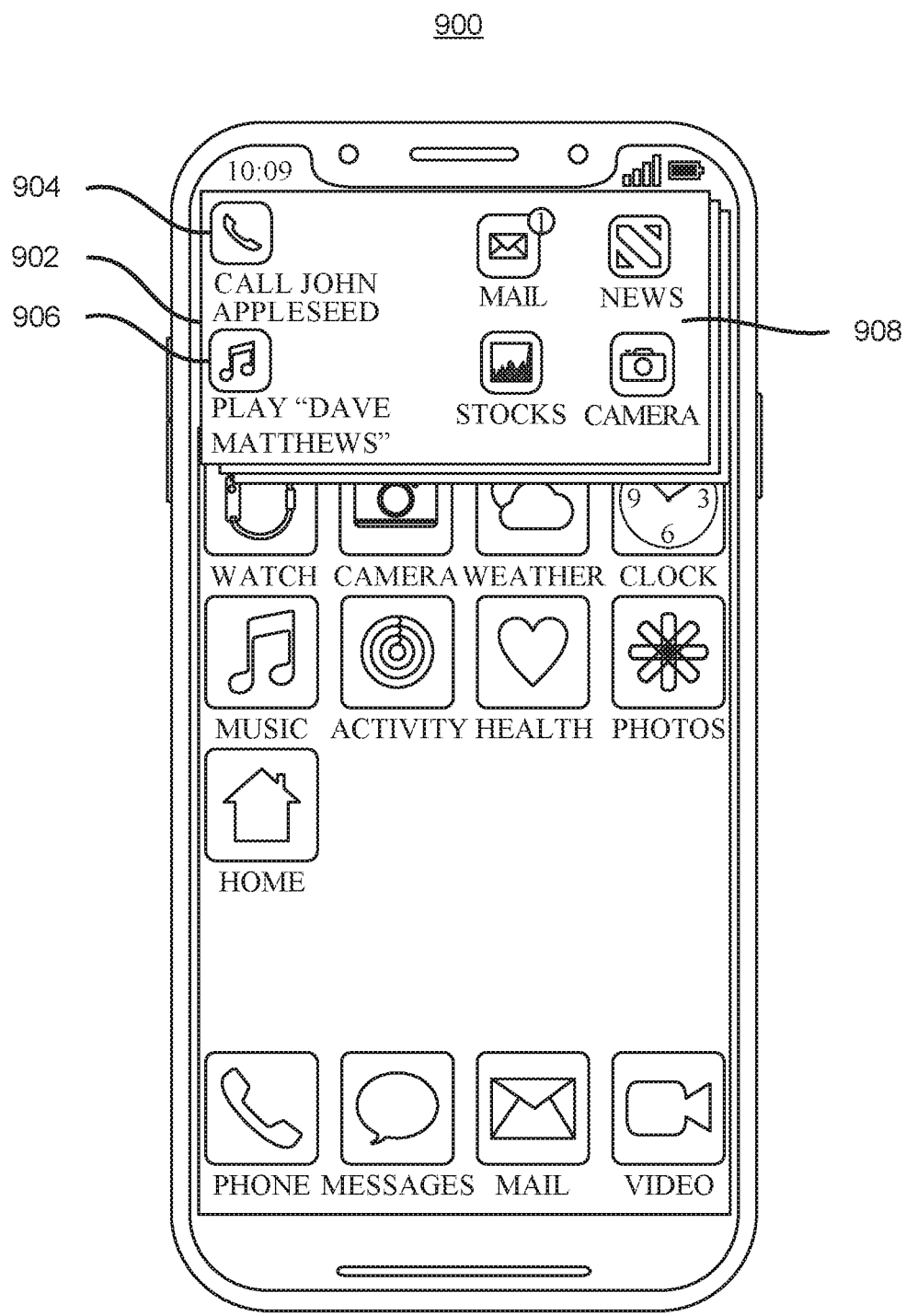
FIG. 9 illustrates a system for providing relevant data items based on context, according to various examples.

With reference to FIG. 9, a selected arrangement of second plurality of data items may be displayed to the user on electronic device 900. In particular, a candidate arrangement including a displayable data item 902 may be displayed. Displayable data item 902 may include various data items associated with tasks and/or applications on device 900. For example, displayable data item 902 may include a data item 904 associated with a task to initiate a telephone call and/or a data item 906 associated with a task to play a specific song or album. Displayable data item 902 may further include data items 908 related to various applications on device 900, such as a news application, a camera application, a mail application, and/or a stocks application. In some examples, a user may configure the size of the displayable data items. For example, the user may configured a user preference indicating a setting for a displayable data item size of eight square units, such that the predetermined display item size is predefined by the user.

In general, input may be received from third parties for utilization in identifying and displaying the data items. For instance, third parties may provide a type associated with a data item. As an example, the user may download a data item provided by a third party, such as a data item associated with an application for a food delivery service. The third party may designate the data item associated with the food delivery service as a data item providing "in-session" content. Additional parameters or other requirements may be associated with specific data items, such as an "in-session" data item. For example, data items corresponding to "in-session" data types may be associated with increased confidence when historical updates to such data items are provided frequently. In particular, when a user engages with the food delivery service application, the user may submit a food order for delivery at a specific address. Once the order is submitted, order updates may be provided to the food delivery service application from the third party. Order updates may be periodically provided, such as once every 10 seconds, once every 30 seconds, once every minute, once every two minutes, etc. For "in-session" type data items, a confidence value associated with the data item may be increased when historical update frequency is above a threshold frequency. In this example, the confidence value associated with the food delivery service application may be increased when updates are provided form the third party at least once every 30 seconds.

In some examples, the third party may designate a data item as a "recommended content" type. A data item corresponding to a news application, for example, may be associated with a "recommended content" type. Specifically, a data item for a news application may include a sufficient display size (e.g., four or eight square units) in order to display a "breaking news" headline and a brief description of the news. In accordance with a determination that an identified data item type corresponds to a "recommended content" type, an amount of view time corresponding to the data item is determined. In particular, user activity indicative of the user viewing the data item including news information may increase the confidence value associated with the data item. For example, the user may be providing user inputs in order to scroll through the grouping of displayed data items. The user may navigate to the news application data item, and "pause" for a sufficient amount of time while the news headline is displayed, and may subsequently continue to scroll through the data item grouping. In this example, the confidence value associated with the news application data item may be increased based on the user activity consistent with the user pausing to view the content from the news application.

Additional user activity related to "recommended content" type data item may result in an increased confidence value. For example, if the user provides a user input corresponding to the news application data item (e.g., a user input proximate to or on the data item), the corresponding news application may be invoked. The news application may further navigate to the specific news article being displayed via the news application data item prior to receiving the user input. In response to receiving the user input indicative of user interest in the news application and/or news article, the confidence value of the news application is increased.

In some examples, context information corresponding to a plurality of users may be obtained based on a detected location of the electronic device. One or more data items may be identified based on the context information. A data item associated with a rideshare application may correspond to a rideshare company. The rideshare company may operate in a first region but not operate in a second region. Accordingly, context information corresponding to a first plurality of users in the first region may indicate that the rideshare application is frequently used among the first plurality of users when the users are located in the first region. Context information corresponding to a second plurality of users in the second region may indicate that the rideshare application is not used among the second plurality of users when the users are located in the second region. In this example, the confidence value associated with the rideshare application may be increased when the detected location of the electronic device corresponds to the first region, and may be decreased when the detected location of the electronic device corresponds to the second region.

Returning to FIG. 9, the user may provide a user input including a selection of a displayed data item. For example, the user may provide an input proximate to or on a data item associated with a task, such as data item 904. Accordingly, a task corresponding to the actionable command may be performed, such as a task for calling a contact named "John Appleseed." In some examples, a confidence value associated with the respective data item 904 may be increased (e.g., the user interaction with the data item may be indicative of a high likelihood of subsequent user interactions with the data item). In some examples, the user may provide an input proximate to or on a data item associated with a device application, such as a data item 908 corresponding to a "Stocks" application on the electronic device. Accordingly, the application corresponding to "Stocks" may be invoked. In some examples, a confidence value associated with the stocks application data item 908 may be increased upon receiving the user input.

Figure 10A:
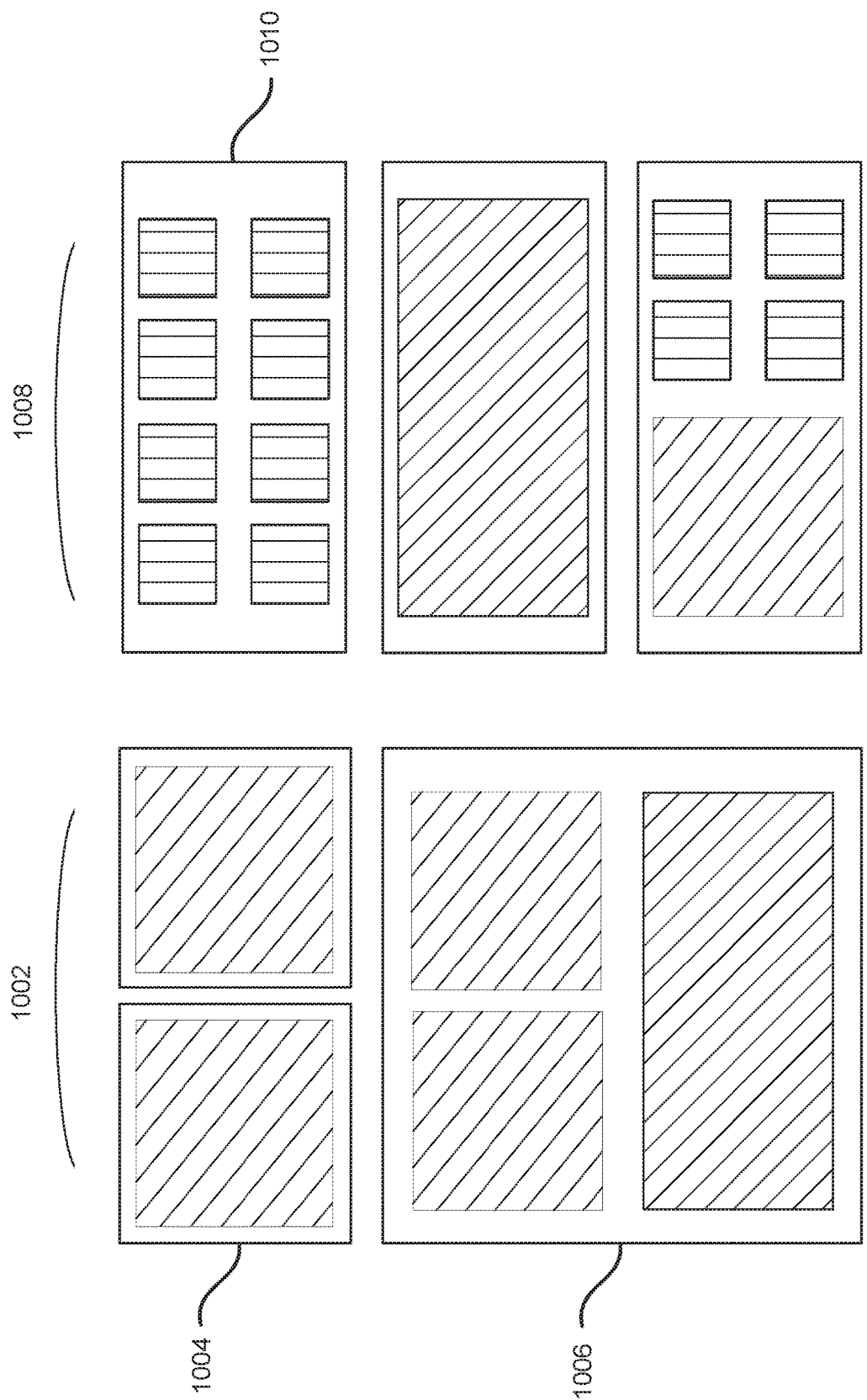
FIGS. 10A-B illustrate systems for providing relevant data items based on context, according to various examples.
Figure 10B:
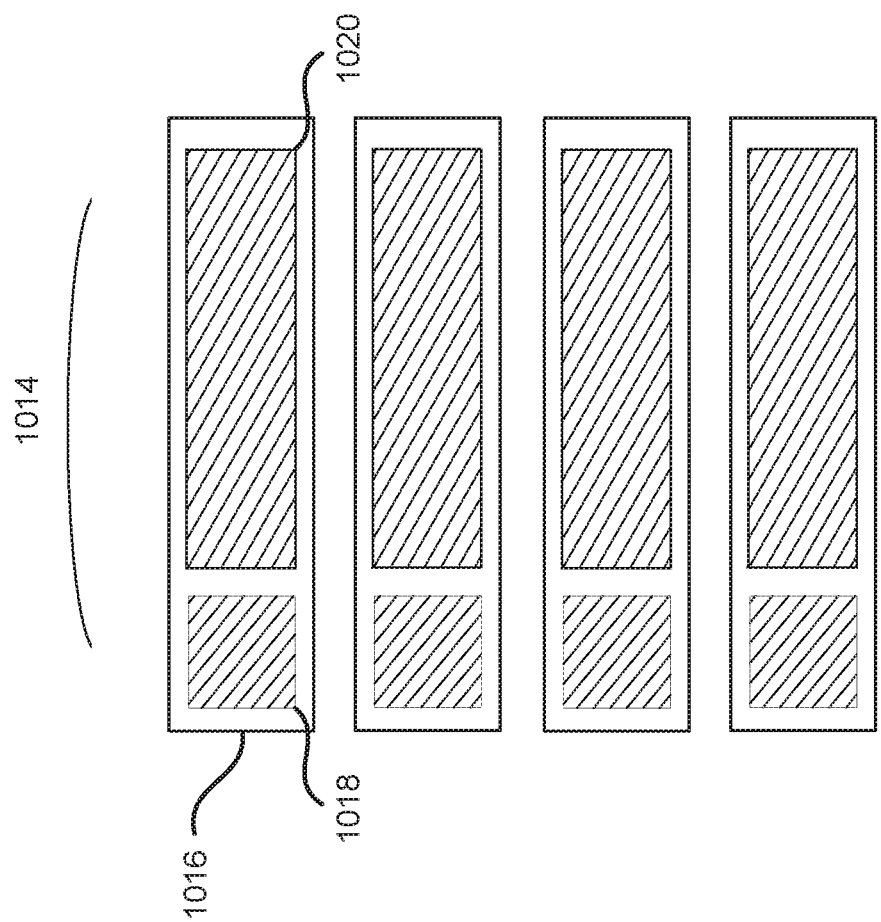

With reference to FIG. 10A, the data items may be arranged and presented to the user in various additional ways. For example, data item arrangement 1002 may include data item 1004. Data item 1004 may be associated with a size of four square units, such that data item 1004 may contain one or more appropriately sized single data items (e.g., a two unit by two unit data item, multiple one unit by one unit data items, etc.). Data item arrangement 1002 may further include data item 1006 associated with a size of sixteen square units, such that data item 1006 may contain one or more appropriately sized single data items (e.g., one or more two unit by two unit data items, one or more two unit by four unit data items, etc.). Data item arrangement 1008, for example, may include data item 1010. Data item 1010 may be associated with a size of eight square units, such that data item 1010 may include one or more appropriately sized single data items (e.g., eight one unit by one unit data items, one or more two unit by two unit data items, etc.). With reference to FIG. 10B, the data items may further be arranged as a "list" or other ordered set. For example, data item arrangement 1014 may include multiple data items 1016. Data items 1016 may include a single data item 1018 (e.g., a one unit by one unit data item) and related display element 1020 associated with corresponding data item 1018. For instance, data item 1018 may include a representation of a device application or other device function, and display element 1020 may include a description or other information related to the device application or function. As an example, data items 1016 may include device applications and corresponding suggestions associated with the device applications (e.g., a "Calendar" application and suggestion to "Create a new calendar event").

Figure 11A:
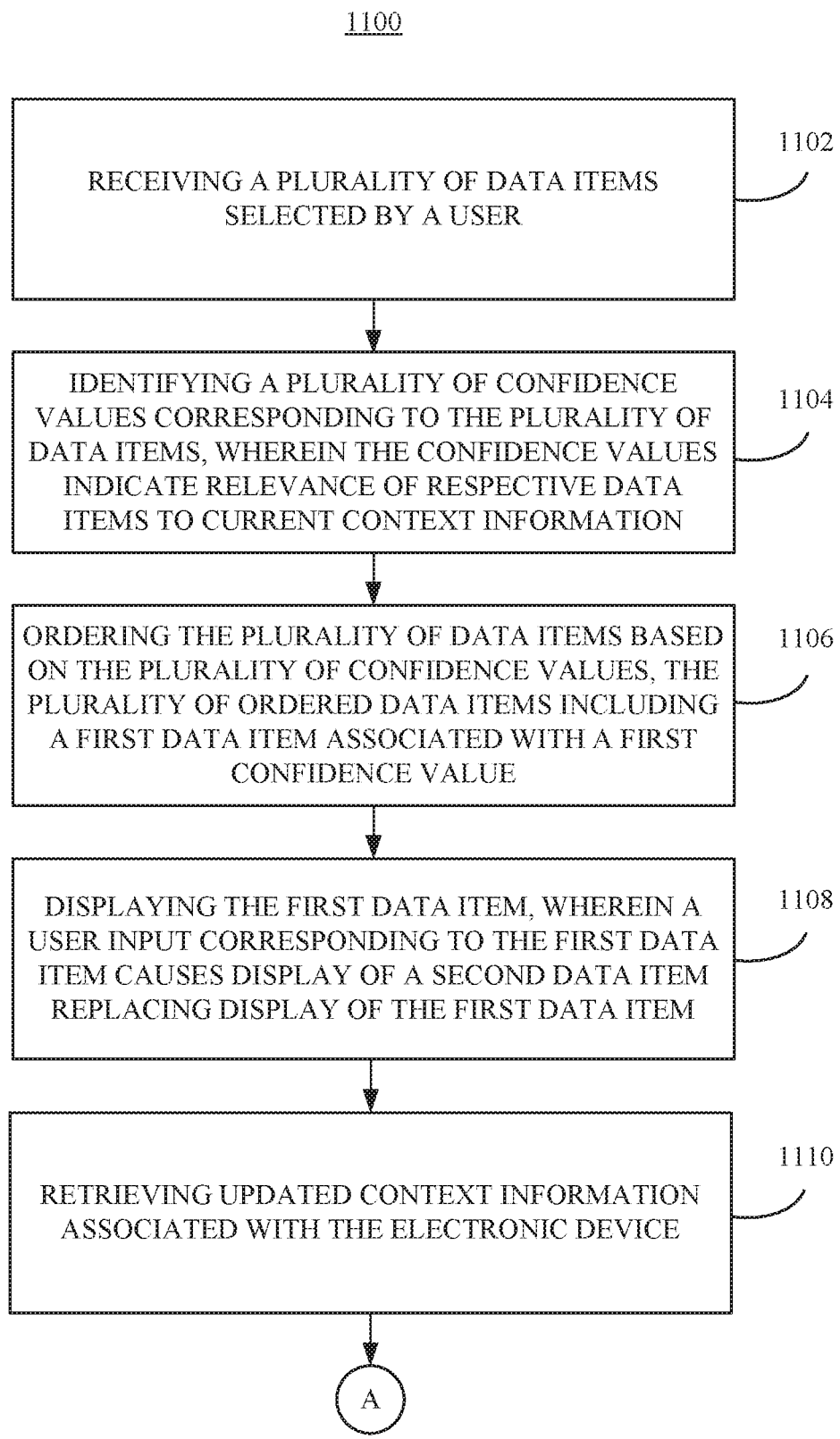
FIGS. 11A-B illustrate a process for providing relevant data items based on context, according to various examples.
Figure 11B:
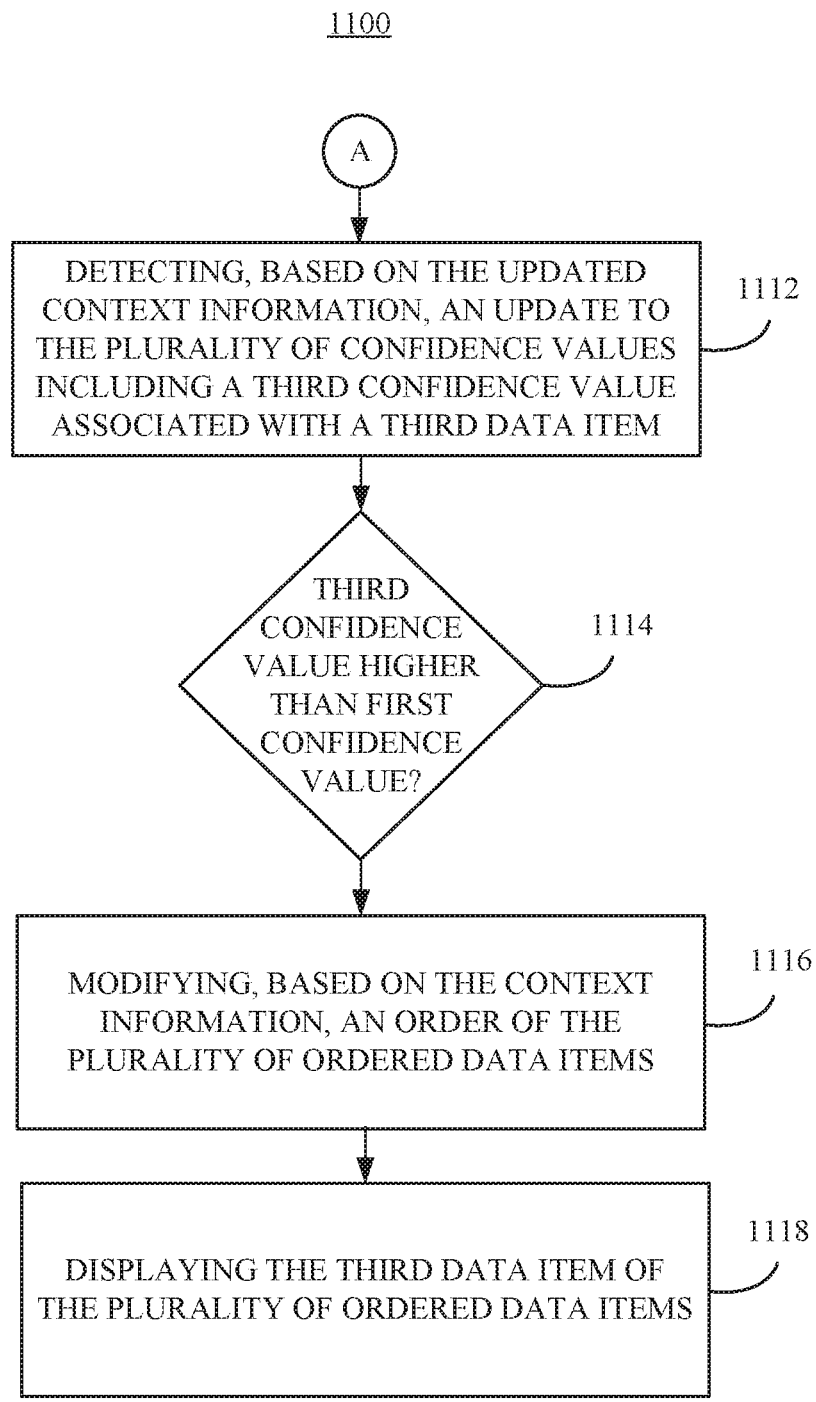

FIGS. 11A-B illustrate process 1100 for providing relevant data items based on context according to various examples. Process 1100 is performed, for example, using one or more electronic devices implementing a digital assistant. In some examples, process 1100 is performed using a client-server system (e.g., system 100), and the blocks of process 1100 are divided up in any manner between the server (e.g., DA server 106) and a client device. In other examples, the blocks of process 1100 are divided up between the server and multiple client devices (e.g., a mobile phone and a smart watch). Thus, while portions of process 1100 are described herein as being performed by particular devices of a client-server system, it will be appreciated that process 1100 is not so limited. In other examples, process 1100 is performed using only a client device (e.g., user device 104) or only multiple client devices. In process 1100, some blocks are, optionally, combined, the order of some blocks is, optionally, changed, and some blocks are, optionally, omitted. In some examples, additional steps may be performed in combination with the process 1100.

At block 1102, a plurality of data items selected by a user is received. At block 1104, a plurality of confidence values corresponding to the plurality of data items are identified, wherein the confidence values indicate relevance of respective data items to current context information. In some examples, in accordance with a determination that no confidence value of the plurality of identified confidence values exceeds a confidence threshold, an additional data item associated with a usage value is identified, and in accordance with a determination that the usage value does not exceed a usage threshold, the additional data item is added to the plurality of data items selected by the user. At block 1106, the plurality of data items may be ordered based on the plurality of confidence values, wherein a first data item of the plurality of ordered data items is associated with a first confidence value of the plurality of confidence values, and a second data item of the plurality of ordered data items is associated with a second confidence value of the plurality of confidence values, wherein the first confidence value is higher than the second confidence value. Ordering a plurality of data items selected by a user based on relevance to current context information provides improved feedback to the user by surfacing the most relevant data items when appropriate. Providing improved feedback to the user enhances the operability of the device and makes the user-device interface more efficient (e.g., by reducing the number of user inputs to navigate to a relevant data item) which, additionally, reduces power usage and improves battery life of the device by enabling the user to use the device more quickly and efficiently.

At block 1108, the first data item is displayed, wherein a user input corresponding to the first data item causes display of the second data item replacing display of the first data item. In some examples, displaying the first data item includes displaying a grouping of the ordered plurality of data items and displaying the first data item as overlaid on the grouping of the ordered plurality of data items. In some examples, the user input corresponding to the first data item includes a contact motion in a first direction, wherein in response to receiving the user input, the second data item is caused to be displayed as replacing display of the first data item. In some examples, a second user input is received corresponding to the second data item, wherein the second user input includes a contact motion in a second direction opposite the first direction, wherein in response to receiving the second user input, the first data item is caused to be displayed as replacing display of the second data item. Permitting a user to navigate back and forth through a grouping of data items provides a user with additional control options without cluttering the user interface with additional displayed controls. Providing additional control options to the user enhances the operability of the device and makes the user-device interface more efficient which, additionally, reduces power usage and improves battery life of the device by enabling the user to use the device more quickly and efficiently.

In some examples, a displayed data item is associated with a device application. In some examples, a user input is received including a selection of the displayed data item, wherein a confidence value associated with the displayed data item is increased, and the device application associated with the displayed data item is invoked, wherein invoking the application includes replacing display of the displayed data item with the invoked application. In some examples, a displayed data item is associated with an actionable command. In some examples, a user input is received including a selection of the displayed data item, wherein a confidence value associated with the displayed data item is increased, and a task is performed associated with the displayed data item, wherein the task corresponds to the actionable command.

At block 1110, updated context information associated with the electronic device is retrieved. In some examples, in response to retrieving the updated context information associated with the electronic device, an additional data item associated with a respective confidence value is identified, and in accordance with a determination that the respective confidence value exceeds a confidence threshold, the additional data item is added to the plurality of data items selected by the user. In some examples, identifying an additional data item associated with a respective confidence value includes receiving an input corresponding to at least one of a user interaction history and a movement history of the electronic device, and identifying, based on the received input, a prediction of a user action as the additional data item. In some examples, an update to the plurality of confidence values is detected based on the updated context information, wherein the updated plurality of confidence values includes a third confidence value associated with a third data item of the plurality of ordered data items. In some examples, identifying an additional data item associated with a respective confidence value includes obtaining at least one of information associated with a device application and information from a remote source, and identifying, based on the obtained information, a notification as the additional data item. In some examples, identifying an additional data item associated with a respective confidence value includes obtaining, based on the current context information, a prediction of a device application, and identifying the device application associated with the prediction as the additional data item. Adding an additional data item to the plurality of data items selected by the user provides an improved system for surfacing relevant data items by performing an operation when a set of conditions has been met without requiring further user input. Performing an operation without requiring further user input enhances the operability of the device and makes the user-device interface more efficient which, additionally, reduces power usage and improves battery life of the device by enabling the user to use the device more quickly and efficiently.

At block 1112, an update to the plurality of confidence values is detected based on the updated context information, wherein the updated plurality of confidence values includes a third confidence value associated with a third data item of the plurality of ordered data items. In some examples, detecting the update to the plurality of confidence values includes identifying a respective confidence value associated with a respective data item, wherein the respective confidence value is based at least in part on an association between the respective data item and a location of the electronic device, detecting movement of the electronic device from a first location to a second location, and in accordance with a determination that the respective data item includes an association with the second location, increasing the respective confidence value. In some examples, detecting, based on the updated context information, an update to the plurality of confidence values includes identifying a respective confidence value associated with a respective data item, wherein the respective confidence value is based at least in part on an association between the respective data item and a calendar event, identifying a start time associated with a respective calendar event, wherein the start time is within a threshold time from a current time, and in accordance with a determination that the respective data item includes an association with the respective calendar event, increasing the respective confidence value. In some examples, detecting, based on the updated context information, an update to the plurality of confidence values includes identifying a respective confidence value associated with a respective data item, wherein the respective confidence value is based at least in part on an association between the respective data item and current information associated with a device application, receiving updated information corresponding to the device application, and in accordance with a determination that the respective data item includes an association with the updated information, adjusting the respective confidence value. In some examples, detecting, based on the updated context information, an update to the plurality of confidence values includes identifying a respective confidence value associated with a respective data item, wherein the respective confidence value is based on at least one of a user preference and a user interaction history, receiving updated information corresponding to at least one of the user preference and the user interaction history, and in accordance with a determination that the respective data item includes an association with the updated information, adjusting the respective confidence value. Determining confidence based on a variety of factors (e.g., location, event start times, updated application information, etc.) provides an improved system for surfacing relevant data items by maintaining an updated grouping of data items depending on the context of the device, and thus surfacing relevant data to the user while the user is interacting with the device. Performing these operations without requiring further user input enhances the operability of the device and makes the user-device interface more efficient which, additionally, reduces power usage and improves battery life of the device by enabling the user to use the device more quickly and efficiently.

At block 1114, a determination is made whether the third confidence value is higher than the first confidence value. At block 1116, in accordance with a determination that the third confidence value is higher than the first confidence value, an order of the plurality of ordered data items is modified based on the context information. In some examples, modifying, based on the context information, an order of the plurality of ordered data items includes modifying an order value of the third data item, wherein the modified order value of the third data item corresponds to a highest order value of plurality of ordered data items, and modifying an order value of each data item of the plurality of data items, wherein the modified order values are arranged in descending order based on a descending order of the updated confidence values. In some examples, a fourth data item is associated with a second highest order value of the plurality of ordered data items, wherein a user input is received corresponding to the displayed third data item, wherein the user input corresponding to the displayed third data item includes a contact motion in a first direction. In some examples, in response to receiving the user input, the fourth data item is caused to be displayed as replacing display of the third data item, and an order value of the fourth data item is modified, wherein the modified order value of the fourth data item corresponds to a highest order value of plurality of ordered data items.

The operations described above with reference to FIGS. 11A-B are optionally implemented by components depicted in FIGS. 1-4, and 6A-B. For example, the operations of process 1100 may be implemented by one or more of operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, applications (or sets of instructions) 236, media service(s) 120-1, processor(s) 220, 410, and/or other components described herein. It would be clear to a person having ordinary skill in the art how other processes are implemented based on the components depicted in FIGS. 1-4 and 6A-B.

Figure 12:
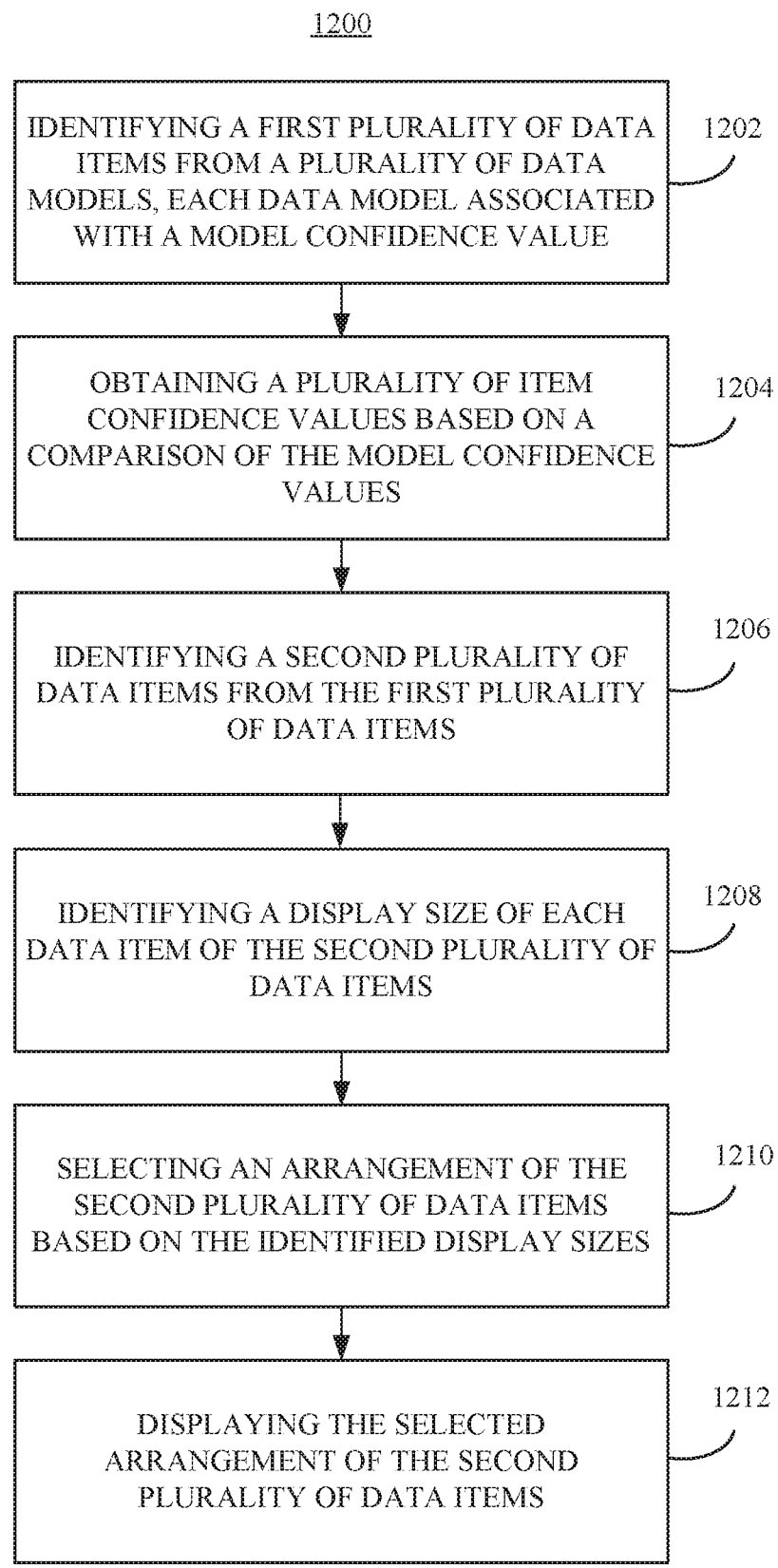
FIG. 12 illustrates a process for providing relevant data items based on context, according to various examples.

FIG. 12 illustrates process 1200 for providing relevant data items based on context according to various examples. Process 1200 is performed, for example, using one or more electronic devices implementing a digital assistant. In some examples, process 1200 is performed using a client-server system (e.g., system 100), and the blocks of process 1200 are divided up in any manner between the server (e.g., DA server 106) and a client device. In other examples, the blocks of process 1200 are divided up between the server and multiple client devices (e.g., a mobile phone and a smart watch). Thus, while portions of process 1200 are described herein as being performed by particular devices of a client-server system, it will be appreciated that process 1200 is not so limited. In other examples, process 1200 is performed using only a client device (e.g., user device 104) or only multiple client devices. In process 1200, some blocks are, optionally, combined, the order of some blocks is, optionally, changed, and some blocks are, optionally, omitted. In some examples, additional steps may be performed in combination with the process 1200.

At block 1202, a first plurality of data items are identified from a plurality of data models, wherein each data model of the plurality of data models is associated with a model confidence value, and each data item of the first plurality of data items is previously selected by a user. In some examples, a type associated with a respective data item is identified, wherein in accordance with a determination that the identified type corresponds to a predetermined type, determining whether a set of criteria associated with the predetermined type is satisfied, and in accordance with a determination that the set of criteria is satisfied, increasing a confidence value associated with the respective data item. In some examples, determining whether a set of criteria associated with the predetermined type is satisfied includes in accordance with a determination that the identified type corresponds to a session type, obtaining parameters associated with historical updates to the respective data item, and in accordance with a determination that the obtained parameters satisfy an update threshold, increasing the confidence value associated with the respective data item. In some examples, determining whether a set of criteria associated with the predetermined type is satisfied includes in accordance with a determination that the identified type corresponds to a recommendation type, identifying an amount of view time corresponding to the respective data item, and in accordance with a determination that the amount of view time satisfies a view time threshold, increasing the confidence value associated with the respective data item. In some examples, determining whether a set of criteria associated with the predetermined type is satisfied includes receiving a user input corresponding to the respective data item while the respective data item is displayed, and in accordance with a determination that the identified type corresponds to a recommendation type, increasing the confidence value associated with the respective data item based on the user input corresponding to the respective data item. Modifying confidence values based on criteria associated with predetermined types of data items provides improved feedback to the user by surfacing relevant data items from third parties so long as such data items meet certain standards for display. Providing the user with improved feedback enhances the operability of the device and makes the user-device interface more efficient which, additionally, reduces power usage and improves battery life of the device by enabling the user to use the device more quickly and efficiently.

At block 1204, a plurality of item confidence values are obtained based on a comparison of the model confidence values, wherein each data item of the first plurality of data items is associated with an item confidence value of the plurality of item confidence values, and the plurality of item confidence values indicate relevance of respective data items to current context information. In some examples, obtaining a plurality of item confidence values based on a comparison of the model confidence values includes identifying a subset of the first plurality of data items, wherein the subset corresponds to a plurality of data items received from a first data model, the subset is associated with a respective plurality of item confidence values, and the data model is associated with a first model confidence value. In some examples, in accordance with a determination that the first model confidence value exceeds a model confidence threshold, a weight of the respective plurality of item confidence values is increased, wherein the obtained plurality of item confidence values includes the weighted plurality of item confidence values. Adjusting weights associated with data items based on the confidence corresponding to related data models provides improved feedback to the user by providing an additional factor by which to further refine the confidence value corresponding to the data items. Providing the user with improved feedback enhances the operability of the device and makes the user-device interface more efficient which, additionally, reduces power usage and improves battery life of the device by enabling the user to use the device more quickly and efficiently.

At block 1206, a second plurality of data items is identified from the first plurality of data items, each data item of the second plurality of data items associated with an item confidence value exceeding a predetermined threshold value. In some examples, identifying a second plurality of data items from the first plurality of data items includes identifying a first data item and a second data item from the first plurality of data items, wherein the first data item and the second data item are each associated with an item confidence value exceeding the predetermined threshold value, determining a similarity score based on the first data item and the second data item, and in accordance with a determination that the similarity score exceeds a similarity threshold, including the first data item in the identified second plurality of data items, and forgoing including the second data item in the identified second plurality of data items, wherein the first data item is associated with a higher confidence score than the second data item. In some examples, identifying a second plurality of data items from the first plurality of data items includes identifying a first data item of the first plurality of data items, wherein the first data item is associated with an item confidence value exceeding the predetermined threshold value, detecting a displayed affordance associated with a device application, determining a similarity score based on the first data item and the device application associated with the displayed affordance, and in accordance with a determination that the similarity score exceeds a similarity threshold, forgoing including the first data item in the identified second plurality of data items. Determining a similarity score based on data items provides improved feedback to the user by removing redundant or duplicative data items from the grouping of data items. Providing the user with improved feedback enhances the operability of the device and makes the user-device interface more efficient which, additionally, reduces power usage and improves battery life of the device by enabling the user to use the device more quickly and efficiently.

At block 1208, a display size of each data item of the second plurality of data items is identified. At block 1210, an arrangement of the second plurality of data items is selected based on the identified display sizes. In some examples, selecting an arrangement of the second plurality of data items includes identifying a first subset of the second plurality of data items, wherein each data item of the first subset is associated with a first display size, identifying a second subset of the second plurality of data items, wherein each data item of the second subset is associated with a second display size, and in accordance with a determination that the first display size is smaller than the second display size, weighting each data item of the first subset higher than each data item of the second subset. In some examples, selecting an arrangement of the second plurality of data items includes identifying a predetermined display item size, and selecting, based on the predetermined display item size, at least one data item of the second plurality of data items, wherein selecting includes identifying a third subset of the second plurality of data items, wherein each data item of the third subset is associated with an item confidence value exceeding a second predetermined threshold value, combining a plurality of display sizes corresponding to data items of the third subset of data items, wherein the combined display size is less than or equal to the predetermined display item size, and providing a plurality of respective data items as a candidate arrangement, wherein the plurality of respective data items correspond to the plurality of combined display sizes. In some examples, the predetermined display item size is predefined by a user. In some examples, selecting an arrangement of the second plurality of data items includes obtaining a plurality of candidate arrangements, identifying a score corresponding to each candidate arrangement of the plurality of candidate arrangements, and selecting a candidate arrangement having a highest score of the identified scores. Determining candidate arrangements of data items reduces the number of inputs needed to perform an operation optimizing the display of single or multiple data items to the user at a time. Reducing the number of inputs needed to perform an operation enhances the operability of the device and makes the user-device interface more efficient which, additionally, reduces power usage and improves battery life of the device by enabling the user to use the device more quickly and efficiently.

At block 1212, the selected arrangement of the second plurality of data items is displayed. In some examples, a third plurality of data items exceeding the predetermined confidence value is identified, wherein the third plurality of data items are not previously selected by a user. In some examples, a display size of each data item of the third plurality of data items is identified, an arrangement of the second plurality of data items and the third plurality of data items is selected based on the identified display sizes, and the selected arrangement of the second plurality of data items and the third plurality of data items is displayed. In some examples, identifying a third plurality of data items exceeding the predetermined confidence value includes receiving an input corresponding to at least one of a user interaction history and a movement history of the electronic device, and identifying, based on the received input, a prediction of a user action as a data item of the third plurality of data items. In some examples, identifying a third plurality of data items exceeding the predetermined confidence value includes obtaining at least one of information associated with a device application and information from a remote source, and identifying, based on the obtained information, a notification as a data item of the third plurality of data items. In some examples, identifying a third plurality of data items exceeding the predetermined confidence value includes obtaining, based on the current context information, a prediction of a device application, and identifying the device application associated with the prediction as a data item of the third plurality of data items. In some examples, a location of the electronic device is detected, additional context information corresponding to a plurality of users is obtained based on the location, and a third plurality of data items is identified associated with a respective plurality of item confidence values, wherein the respective plurality of item confidence values indicates relevance of the third plurality of data items to the additional context information. Determining confidence based on a variety of factors (e.g., location, event start times, updated application information, etc.) provides an improved system for surfacing relevant data items by maintaining an updated grouping of data items depending on the context of the device, and thus surfacing relevant data to the user while the user is interacting with the device. Performing these operations without requiring further user input enhances the operability of the device and makes the user-device interface more efficient which, additionally, reduces power usage and improves battery life of the device by enabling the user to use the device more quickly and efficiently.

The operations described above with reference to FIG. 12 are optionally implemented by components depicted in FIGS. 1-4 and 6A-B. For example, the operations of process 1200 may be implemented by one or more of operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, applications (or sets of instructions) 236, media service(s) 120-1, processor(s) 220, 410, and/or other components described herein. It would be clear to a person having ordinary skill in the art how other processes are implemented based on the components depicted in FIGS. 1-4 and 6A-B.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of relevant data items based on current context. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to updated confidence levels associated with data items selected by the user and/or additional data items not selected by the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of providing relevant data items to a user, the present technology can be configured to allow users to select to "opt in" or "opt out" of participation in the collection of personal information data during registration for services or anytime thereafter. In another examples, users can select to not provide personal information for providing relevant data items, such as information associated with saved contact or calendar information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, data items may be selected and provided to users by inferring preferences based on non-personal information data or a bare minimum amount of personal information, such as the content being requested by the device associated with a user, other non-personal information available for providing relevant data items, or publicly available information.

What is claimed is:

1. An electronic device, comprising:
   one or more processors:
   a memory; and
   one or more programs, wherein the one or more programs are stored in the memory and configured to be executed by the one or more processors, the one or more programs including instructions for:
   receiving a plurality of data items selected by a user, wherein the plurality of data items is associated with a ranking previously configured by the user;
   identifying a plurality of confidence values corresponding to the plurality of data items, wherein the confidence values are based on:
      a relevance of respective data items to current context information, and
      the ranking previously configured by the user;
   ordering the plurality of data items based on the plurality of confidence values, wherein:
      a first data item of the plurality of ordered data items is associated with a first confidence value of the plurality of confidence values, and
      a second data item of the plurality of ordered data items is associated with a second confidence value of the plurality of confidence values, wherein the first confidence value is higher than the second confidence value;
   displaying the first data item, wherein a user input corresponding to the first data item causes display of the second data item replacing display of the first data item;
   retrieving updated context information associated with the electronic device;
   detecting, based on the updated context information, an update to the plurality of confidence values, wherein the updated plurality of confidence values includes a third confidence value associated with a third data item of the plurality of ordered data items; and
   in accordance with a determination that the third confidence value is higher than the first confidence value:
      modifying, based on the context information, an order of the plurality of ordered data items; and
      displaying the third data item of the plurality of ordered data items.

2. The electronic device of claim 1, wherein displaying the first data item comprises:
   displaying a grouping of the ordered plurality of data items; and
   displaying the first data item as overlaid on the grouping of the ordered plurality of data items.

3. The electronic device of claim 1, wherein detecting, based on the updated context information, an update to the plurality of confidence values comprises:
   identifying a respective confidence value associated with a respective data item, wherein the respective confidence value is based at least in part on an association between the respective data item and a location of the electronic device;
   detecting movement of the electronic device from a first location to a second location; and
   in accordance with a determination that the respective data item includes an association with the second location, increasing the respective confidence value.

4. The electronic device of claim 1, wherein detecting, based on the updated context information, an update to the plurality of confidence values comprises:
   identifying a respective confidence value associated with a respective data item, wherein the respective confidence value is based at least in part on an association between the respective data item and a calendar event;
   identifying a start time associated with a respective calendar event, wherein the start time is within a threshold time from a current time; and
   in accordance with a determination that the respective data item includes an association with the respective calendar event, increasing the respective confidence value.

5. The electronic device of claim 1, wherein detecting, based on the updated context information, an update to the plurality of confidence values comprises:
identifying a respective confidence value associated with a respective data item, wherein the respective confidence value is based at least in part on an association between the respective data item and current information associated with a device application;
receiving updated information corresponding to the device application; and
in accordance with a determination that the respective data item includes an association with the updated information, adjusting the respective confidence value.

6. The electronic device of claim 1, wherein detecting, based on the updated context information, an update to the plurality of confidence values comprises:
identifying a respective confidence value associated with a respective data item, wherein the respective confidence value is based on at least one of a user preference and a user interaction history;
receiving updated information corresponding to at least one of the user preference and the user interaction history; and
in accordance with a determination that the respective data item includes an association with the updated information, adjusting the respective confidence value.

7. The electronic device of claim 1, wherein modifying, based on the context information, an order of the plurality of ordered data items comprises:
modifying an order value of the third data item, wherein the modified order value of the third data item corresponds to a highest order value of plurality of ordered data items; and
modifying an order value of each data item of the plurality of data items, wherein the modified order values are arranged in descending order based on a descending order of the updated confidence values.

8. The electronic device of claim 7, wherein a fourth data item is associated with a second highest order value of the plurality of ordered data items, comprising:
receiving a user input corresponding to the displayed third data item, wherein the user input corresponding to the displayed third data item includes a contact motion in a first direction;
in response to receiving the user input, causing display of the fourth data item replacing display of the third data item; and
modifying an order value of the fourth data item, wherein the modified order value of the fourth data item corresponds to a highest order value of plurality of ordered data items.

9. The electronic device of claim 1, the one or more programs including instructions for:
in response to retrieving the updated context information associated with the electronic device, identifying an additional data item associated with a respective confidence value; and
in accordance with a determination that the respective confidence value exceeds a confidence threshold, adding the additional data item to the plurality of data items selected by the user.

10. The electronic device of claim 9, wherein identifying an additional data item associated with a respective confidence value comprises:
receiving an input corresponding to at least one of a user interaction history and a movement history of the electronic device; and
identifying, based on the received input, a prediction of a user action as the additional data item.

11. The electronic device of claim 9, wherein identifying an additional data item associated with a respective confidence value comprises:
obtaining at least one of information associated with a device application and information from a remote source; and
identifying, based on the obtained information, a notification as the additional data item.

12. The electronic device of claim 9, wherein identifying an additional data item associated with a respective confidence value comprises:
obtaining, based on the current context information, a prediction of a device application; and
identifying the device application associated with the prediction as the additional data item.

13. The electronic device of claim 1, the one or more programs including instructions for:
in accordance with a determination that no confidence value of the plurality of identified confidence values exceeds a confidence threshold, identifying an additional data item associated with a usage value; and
in accordance with a determination that the usage value does not exceed a usage threshold, adding the additional data item to the plurality of data items selected by the user.

14. The electronic device of claim 1, the one or more programs including instructions for:
receiving the user input corresponding to the first data item, wherein the user input corresponding to the first data item includes a contact motion in a first direction;
in response to receiving the user input, causing display of the second data item replacing display of the first data item;
receiving a second user input corresponding to the second data item, wherein the second user input includes a contact motion in a second direction opposite the first direction; and
in response to receiving the second user input, causing display of the first data item replacing display of the second data item.

15. The electronic device of claim 1, wherein a displayed data item is associated with a device application, the one or more programs including instructions for:
receiving a user input including a selection of the displayed data item;
increasing a confidence value associated with the displayed data item; and
invoking the device application associated with the displayed data item, wherein invoking the application includes replacing display of the displayed data item with the invoked application.

16. The electronic device of claim 1, wherein a displayed data item is associated with an actionable command, the one or more programs including instructions for:
receiving a user input including a selection of the displayed data item;
increasing a confidence value associated with the displayed data item; and
performing a task associated with the displayed data item, wherein the task corresponds to the actionable command.

17. A computer-implemented method, comprising:
at an electronic device with one or more processors and memory:

receiving a plurality of data items selected by a user, wherein the plurality of data items is associated with a ranking previously configured by the user;
identifying a plurality of confidence values corresponding to the plurality of data items, wherein the confidence values are based on:
   a relevance of respective data items to current context information, and
   the ranking previously configured by the user;
ordering the plurality of data items based on the plurality of confidence values, wherein:
   a first data item of the plurality of ordered data items is associated with a first confidence value of the plurality of confidence values, and
   a second data item of the plurality of ordered data items is associated with a second confidence value of the plurality of confidence values, wherein the first confidence value is higher than the second confidence value;
displaying the first data item, wherein a user input corresponding to the first data item causes display of the second data item replacing display of the first data item;
retrieving updated context information associated with the electronic device;
detecting, based on the updated context information, an update to the plurality of confidence values, wherein the updated plurality of confidence values includes a third confidence value associated with a third data item of the plurality of ordered data items; and
in accordance with a determination that the third confidence value is higher than the first confidence value:
   modifying, based on the context information, an order of the plurality of ordered data items; and
   displaying the third data item of the plurality of ordered data items.

18. A non-transitory computer-readable storage medium storing one or more programs, the one or more programs comprising instructions, which when executed by one or more processors of an electronic device, cause the electronic device to:
receive a plurality of data items selected by a user, wherein the plurality of data items is associated with a ranking previously configured by the user;
identify a plurality of confidence values corresponding to the plurality of data items, wherein the confidence values are based on:
   a relevance of respective data items to current context information, and
   the ranking previously configured by the user;
order the plurality of data items based on the plurality of confidence values, wherein:
   a first data item of the plurality of ordered data items is associated with a first confidence value of the plurality of confidence values, and
   a second data item of the plurality of ordered data items is associated with a second confidence value of the plurality of confidence values, wherein the first confidence value is higher than the second confidence value;
display the first data item, wherein a user input corresponding to the first data item causes display of the second data item replacing display of the first data item;
retrieve updated context information associated with the electronic device;
detect, based on the updated context information, an update to the plurality of confidence values, wherein the updated plurality of confidence values includes a third confidence value associated with a third data item of the plurality of ordered data items; and
in accordance with a determination that the third confidence value is higher than the first confidence value:
   modify, based on the context information, an order of the plurality of ordered data items; and
   display the third data item of the plurality of ordered data items.

19. The method of claim 17, wherein displaying the first data item comprises:
displaying a grouping of the ordered plurality of data items; and
displaying the first data item as overlaid on the grouping of the ordered plurality of data items.

20. The method of claim 17, wherein detecting, based on the updated context information, an update to the plurality of confidence values comprises:
identifying a respective confidence value associated with a respective data item, wherein the respective confidence value is based at least in part on an association between the respective data item and a location of the electronic device;
detecting movement of the electronic device from a first location to a second location; and
in accordance with a determination that the respective data item includes an association with the second location, increasing the respective confidence value.

21. The method of claim 17, wherein detecting, based on the updated context information, an update to the plurality of confidence values comprises:
identifying a respective confidence value associated with a respective data item, wherein the respective confidence value is based at least in part on an association between the respective data item and a calendar event;
identifying a start time associated with a respective calendar event, wherein the start time is within a threshold time from a current time; and
in accordance with a determination that the respective data item includes an association with the respective calendar event, increasing the respective confidence value.

22. The method of claim 17, wherein detecting, based on the updated context information, an update to the plurality of confidence values comprises:
identifying a respective confidence value associated with a respective data item, wherein the respective confidence value is based at least in part on an association between the respective data item and current information associated with a device application;
receiving updated information corresponding to the device application; and
in accordance with a determination that the respective data item includes an association with the updated information, adjusting the respective confidence value.

23. The method of claim 17, wherein detecting, based on the updated context information, an update to the plurality of confidence values comprises:
identifying a respective confidence value associated with a respective data item, wherein the respective confidence value is based on at least one of a user preference and a user interaction history;
receiving updated information corresponding to at least one of the user preference and the user interaction history; and in accordance with a determination that the respective data item includes an association with the updated information, adjusting the respective confidence value.

24. The method of claim 17, wherein modifying, based on the context information, an order of the plurality of ordered data items comprises:
   modifying an order value of the third data item, wherein the modified order value of the third data item corresponds to a highest order value of plurality of ordered data items; and
   modifying an order value of each data item of the plurality of data items, wherein the modified order values are arranged in descending order based on a descending order of the updated confidence values.

25. The method of claim 17, wherein a fourth data item is associated with a second highest order value of the plurality of ordered data items, comprising:
   receiving a user input corresponding to the displayed third data item, wherein the user input corresponding to the displayed third data item includes a contact motion in a first direction;
   in response to receiving the user input, causing display of the fourth data item replacing display of the third data item; and
   modifying an order value of the fourth data item, wherein the modified order value of the fourth data item corresponds to a highest order value of plurality of ordered data items.

26. The method of claim 17, comprising:
   in response to retrieving the updated context information associated with the electronic device, identifying an additional data item associated with a respective confidence value; and
   in accordance with a determination that the respective confidence value exceeds a confidence threshold, adding the additional data item to the plurality of data items selected by the user.

27. The method of claim 26, wherein identifying an additional data item associated with a respective confidence value comprises:
   receiving an input corresponding to at least one of a user interaction history and a movement history of the electronic device; and
   identifying, based on the received input, a prediction of a user action as the additional data item.

28. The method of claim 26, wherein identifying an additional data item associated with a respective confidence value comprises:
   obtaining at least one of information associated with a device application and information from a remote source; and
   identifying, based on the obtained information, a notification as the additional data item.

29. The method of claim 26, wherein identifying an additional data item associated with a respective confidence value comprises:
   obtaining, based on the current context information, a prediction of a device application; and
   identifying the device application associated with the prediction as the additional data item.

30. The method of claim 17, comprising:
   in accordance with a determination that no confidence value of the plurality of identified confidence values exceeds a confidence threshold, identifying an additional data item associated with a usage value; and
   in accordance with a determination that the usage value does not exceed a usage threshold, adding the additional data item to the plurality of data items selected by the user.

31. The method of claim 17, comprising:
   receiving the user input corresponding to the first data item, wherein the user input corresponding to the first data item includes a contact motion in a first direction;
   in response to receiving the user input, causing display of the second data item replacing display of the first data item;
   receiving a second user input corresponding to the second data item, wherein the second user input includes a contact motion in a second direction opposite the first direction; and
   in response to receiving the second user input, causing display of the first data item replacing display of the second data item.

32. The method of claim 17, wherein a displayed data item is associated with a device application, comprising:
   receiving a user input including a selection of the displayed data item;
   increasing a confidence value associated with the displayed data item; and
   invoking the device application associated with the displayed data item, wherein invoking the application includes replacing display of the displayed data item with the invoked application.

33. The method of claim 17, wherein a displayed data item is associated with an actionable command, comprising:
   receiving a user input including a selection of the displayed data item;
   increasing a confidence value associated with the displayed data item; and
   performing a task associated with the displayed data item, wherein the task corresponds to the actionable command.

34. The computer-readable storage medium of claim 18, wherein displaying the first data item comprises:
   displaying a grouping of the ordered plurality of data items; and
   displaying the first data item as overlaid on the grouping of the ordered plurality of data items.

35. The computer-readable storage medium of claim 18, wherein detecting, based on the updated context information, an update to the plurality of confidence values comprises:
   identifying a respective confidence value associated with a respective data item, wherein the respective confidence value is based at least in part on an association between the respective data item and a location of the electronic device;
   detecting movement of the electronic device from a first location to a second location; and
   in accordance with a determination that the respective data item includes an association with the second location, increasing the respective confidence value.

36. The computer-readable storage medium of claim 18, wherein detecting, based on the updated context information, an update to the plurality of confidence values comprises:
   identifying a respective confidence value associated with a respective data item, wherein the respective confidence value is based at least in part on an association between the respective data item and a calendar event;

identifying a start time associated with a respective calendar event, wherein the start time is within a threshold time from a current time, and in accordance with a determination that the respective data item includes an association with the respective calendar event, increasing the respective confidence value.

37. The computer-readable storage medium of claim 18, wherein detecting, based on the updated context information, an update to the plurality of confidence values comprises:

identifying a respective confidence value associated with a respective data item, wherein the respective confidence value is based at least in part on an association between the respective data item and current information associated with a device application;

receiving updated information corresponding to the device application; and in accordance with a determination that the respective data item includes an association with the updated information, adjusting the respective confidence value.

38. The computer-readable storage medium of claim 18, wherein detecting, based on the updated context information, an update to the plurality of confidence values comprises:

identifying a respective confidence value associated with a respective data item, wherein the respective confidence value is based on at least one of a user preference and a user interaction history;

receiving updated information corresponding to at least one of the user preference and the user interaction history; and in accordance with a determination that the respective data item includes an association with the updated information, adjusting the respective confidence value.

39. The computer-readable storage medium of claim 18, wherein modifying, based on the context information, an order of the plurality of ordered data items comprises:

modifying an order value of the third data item, wherein the modified order value of the third data item corresponds to a highest order value of plurality of ordered data items; and modifying an order value of each data item of the plurality of data items, wherein the modified order values are arranged in descending order based on a descending order of the updated confidence values.

40. The computer-readable storage medium of claim 18, wherein a fourth data item is associated with a second highest order value of the plurality of ordered data items, wherein the instructions further cause the electronic device to:

receive a user input corresponding to the displayed third data item, wherein the user input corresponding to the displayed third data item includes a contact motion in a first direction;

in response to receiving the user input, cause display of the fourth data item replacing display of the third data item; and modify an order value of the fourth data item, wherein the modified order value of the fourth data item corresponds to a highest order value of plurality of ordered data items.

41. The computer-readable storage medium of claim 18, wherein the instructions further cause the electronic device to:

in response to retrieving the updated context information associated with the electronic device, identify an additional data item associated with a respective confidence value; and in accordance with a determination that the respective confidence value exceeds a confidence threshold, add the additional data item to the plurality of data items selected by the user.

42. The computer-readable storage medium of claim 41, wherein identifying an additional data item associated with a respective confidence value comprises:

receiving an input corresponding to at least one of a user interaction history and a movement history of the electronic device; and identifying, based on the received input, a prediction of a user action as the additional data item.

43. The computer-readable storage medium of claim 41, wherein identifying an additional data item associated with a respective confidence value comprises:

obtaining at least one of information associated with a device application and information from a remote source; and identifying, based on the obtained information, a notification as the additional data item.

44. The computer-readable storage medium of claim 41, wherein identifying an additional data item associated with a respective confidence value comprises:

obtaining, based on the current context information, a prediction of a device application; and identifying the device application associated with the prediction as the additional data item.

45. The computer-readable storage medium of claim 18, wherein the instructions further cause the electronic device to:

in accordance with a determination that no confidence value of the plurality of identified confidence values exceeds a confidence threshold, identify an additional data item associated with a usage value; and in accordance with a determination that the usage value does not exceed a usage threshold, add the additional data item to the plurality of data items selected by the user.

46. The computer-readable storage medium of claim 18, wherein the instructions further cause the electronic device to:

receive the user input corresponding to the first data item, wherein the user input corresponding to the first data item includes a contact motion in a first direction;

in response to receiving the user input, cause display of the second data item replacing display of the first data item;

receive a second user input corresponding to the second data item, wherein the second user input includes a contact motion in a second direction opposite the first direction; and in response to receiving the second user input, cause display of the first data item replacing display of the second data item.

47. The computer-readable storage medium of claim 18, wherein a displayed data item is associated with a device application, wherein the instructions further cause the electronic device to:

receive a user input including a selection of the displayed data item;

increase a confidence value associated with the displayed data item; and invoke the device application associated with the displayed data item, wherein invoking the application includes replacing display of the displayed data item with the invoked application.

48. The computer-readable storage medium of claim 18, wherein a displayed data item is associated with an actionable command, wherein the instructions further cause the electronic device to:
receive a user input including a selection of the displayed data item;
increase a confidence value associated with the displayed data item; and
perform a task associated with the displayed data item, wherein the task corresponds to the actionable command.

49. The electronic device of claim 1, the one or more programs including instructions for:
receiving a first user input associated with a first ranking of a first respective data item of the plurality of data items;
receiving a second user input associated with a second ranking of a second respective data item of the plurality of data items, wherein the second ranking is lower than the first ranking;
identifying a first confidence value of the first respective data item based on the first ranking; and
identifying a second confidence value of the second respective data item based on the second ranking, wherein the second confidence value is lower than the first confidence value.

50. The electronic device of claim 1, the one or more programs including instructions for:
receiving a user input corresponding to a respective data item of the plurality of data items, wherein the user input includes a predetermined motion pattern;
in response to receiving the user input, removing the respective data item from the plurality of data items.

51. The electronic device of claim 1, the one or more programs including instructions for:
receiving a first user input associated with a first respective data item of the plurality of data items, wherein the first user input includes movement of the first respective data item to a position lower than a second respective data item; and
modifying a first confidence value of the first respective data item based on the first user input, wherein the modified first confidence value is lower than a confidence value associated with the second respective data item.

52. The method of claim 17, comprising:
receiving a first user input associated with a first ranking of a first respective data item of the plurality of data items;
receiving a second user input associated with a second ranking of a second respective data item of the plurality of data items, wherein the second ranking is lower than the first ranking;
identifying a first confidence value of the first respective data item based on the first ranking; and
identifying a second confidence value of the second respective data item based on the second ranking, wherein the second confidence value is lower than the first confidence value.

53. The method of claim 17, comprising:
receiving a user input corresponding to a respective data item of the plurality of data items, wherein the user input includes a predetermined motion pattern;
in response to receiving the user input, removing the respective data item from the plurality of data items.

54. The method of claim 17, comprising:
receiving a first user input associated with a first respective data item of the plurality of data items, wherein the first user input includes movement of the first respective data item to a position lower than a second respective data item; and
modifying a first confidence value of the first respective data item based on the first user input, wherein the modified first confidence value is lower than a confidence value associated with the second respective data item.

55. The computer-readable storage medium of claim 18, wherein the instructions further cause the electronic device to:
receive a first user input associated with a first ranking of a first respective data item of the plurality of data items;
receive a second user input associated with a second ranking of a second respective data item of the plurality of data items, wherein the second ranking is lower than the first ranking;
identify a first confidence value of the first respective data item based on the first ranking; and
identify a second confidence value of the second respective data item based on the second ranking, wherein the second confidence value is lower than the first confidence value.

56. The computer-readable storage medium of claim 18, wherein the instructions further cause the electronic device to:
receive a user input corresponding to a respective data item of the plurality of data items, wherein the user input includes a predetermined motion pattern;
in response to receiving the user input, remove the respective data item from the plurality of data items.

57. The computer-readable storage medium of claim 18, wherein the instructions further cause the electronic device to:
receive a first user input associated with a first respective data item of the plurality of data items, wherein the first user input includes movement of the first respective data item to a position lower than a second respective data item, and
modifying a first confidence value of the first respective data item based on the first user input, wherein the modified first confidence value is lower than a confidence value associated with the second respective data item.

* * * * *

UNITED STATES PATENT AND TRADEMARK OFFICE
CERTIFICATE OF CORRECTION

PATENT NO. : 11,061,543 B1
APPLICATION NO. : 17/019140
DATED : July 13, 2021
INVENTOR(S) : John L. Blatz et al.

Page 1 of 1

It is certified that error appears in the above-identified patent and that said Letters Patent is hereby corrected as shown below:

In the Claims

In Claim 1, Column 53, Line 62, delete "processors:" and insert -- processors; --, therefor.

In Claim 36, Column 61, Line 3, delete "time," and insert -- time; --, therefor.

In Claim 57, Column 64, Line 53, delete "item," and insert -- item; --, therefor.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*